US007881319B2

(12) United States Patent  (10) Patent No.: US 7,881,319 B2
Dobson et al.  (45) Date of Patent: Feb. 1, 2011

(54) DATA STORAGE AND PROCESSING SYSTEMS

(75) Inventors: Robert William Albert Dobson, London (GB); Keith Reed, London (GB); Christopher Greening, London (GB)

(73) Assignee: Actix Limited, Hammersmith (GB)

( * ) Notice: Subject to any disclaimer, the term of this patent is extended or adjusted under 35 U.S.C. 154(b) by 909 days.

(21) Appl. No.: 10/590,742

(22) PCT Filed: Feb. 27, 2004

(86) PCT No.: PCT/GB2004/000804

§ 371 (c)(1),
(2), (4) Date: May 7, 2007

(87) PCT Pub. No.: WO2005/086418

PCT Pub. Date: Sep. 15, 2005

(65) Prior Publication Data

US 2007/0291757 A1    Dec. 20, 2007

(51) Int. Cl.
*H04L 12/28* (2006.01)
(52) U.S. Cl. .............. 370/412; 370/230; 370/254; 370/351; 370/392; 370/401; 709/226; 709/229; 709/230; 709/231; 709/240
(58) Field of Classification Search ............. 370/230, 370/254, 351, 389, 392, 468, 460; 709/226, 709/229, 230–233, 238–240
See application file for complete search history.

(56) References Cited

U.S. PATENT DOCUMENTS

| 5,056,058 | A | * | 10/1991 | Hirata et al. ............... 709/230 |
| 5,386,514 | A | * | 1/1995 | Lary et al. ............... 710/54 |
| 5,787,253 | A | | 7/1998 | McCreery et al. |
| 5,805,589 | A | * | 9/1998 | Hochschild et al. ......... 370/389 |
| 5,828,835 | A | * | 10/1998 | Isfeld et al. ............... 709/200 |
| 5,974,503 | A | * | 10/1999 | Venkatesh et al. .......... 711/114 |
| 6,157,955 | A | | 12/2000 | Fall et al. |

(Continued)

FOREIGN PATENT DOCUMENTS

WO     WO 02/23805 A    3/2002

(Continued)

OTHER PUBLICATIONS

International Search Report for PCT/GB2004/000804, filed Feb. 27, 2004, report completed Nov. 10, 2004 by D. Peeters of the EPO.

(Continued)

*Primary Examiner*—Ayaz R Sheikh
*Assistant Examiner*—Andrew C Lee

(57) ABSTRACT

We describe techniques for storing and processing data captured in large volumes from digital mobile phone networks. One technique inputs a stream of messages, writes sequential sets of message parameters into a first FIFO at an entry point; reads the parameters from an exit point; and writes the read parameters into a second data structure. Importantly in this technique the entry point and the exit point are separated by predetermined minimum length defined in terms of a number of the sets of parameters and/or a time. Some preferred implementations also include a last value data store or bucket to store one or more most recent previous values of message parameters.

33 Claims, 11 Drawing Sheets

U.S. PATENT DOCUMENTS

| | | | |
|---|---|---|---|
| 6,526,044 B1 | 2/2003 | Cookmeyer, II et al. | |
| 6,662,280 B1 * | 12/2003 | Hughes | 711/156 |
| 6,665,725 B1 | 12/2003 | Torgerson et al. | |
| 7,031,904 B1 * | 4/2006 | Wilson et al. | 709/230 |
| 7,155,440 B1 * | 12/2006 | Kronmiller et al. | 707/100 |
| 7,274,705 B2 * | 9/2007 | Chang et al. | 370/413 |
| 7,460,473 B1 * | 12/2008 | Kodama et al. | 370/230 |
| 2003/0037190 A1 * | 2/2003 | Alexander et al. | 710/52 |
| 2003/0187977 A1 | 10/2003 | Cranor et al. | |
| 2004/0085982 A1 * | 5/2004 | Choi | 370/412 |
| 2005/0240745 A1 * | 10/2005 | Iyer et al. | 711/167 |
| 2006/0292292 A1 * | 12/2006 | Brightman et al. | 427/66 |

FOREIGN PATENT DOCUMENTS

| | | |
|---|---|---|
| WO | WO 03/096729 A | 11/2003 |

OTHER PUBLICATIONS

Written Opinion of the International Searching Authority (PCT Rule 43 *bis*. 1) for PCT/GB2004/000804 filed Feb. 27, 2004.

international Search Report for PCT/GB2004/000804, filed Feb. 27, 2004, report completed Sep. 11, 2007 by D. Peeters of the EPO.

* cited by examiner

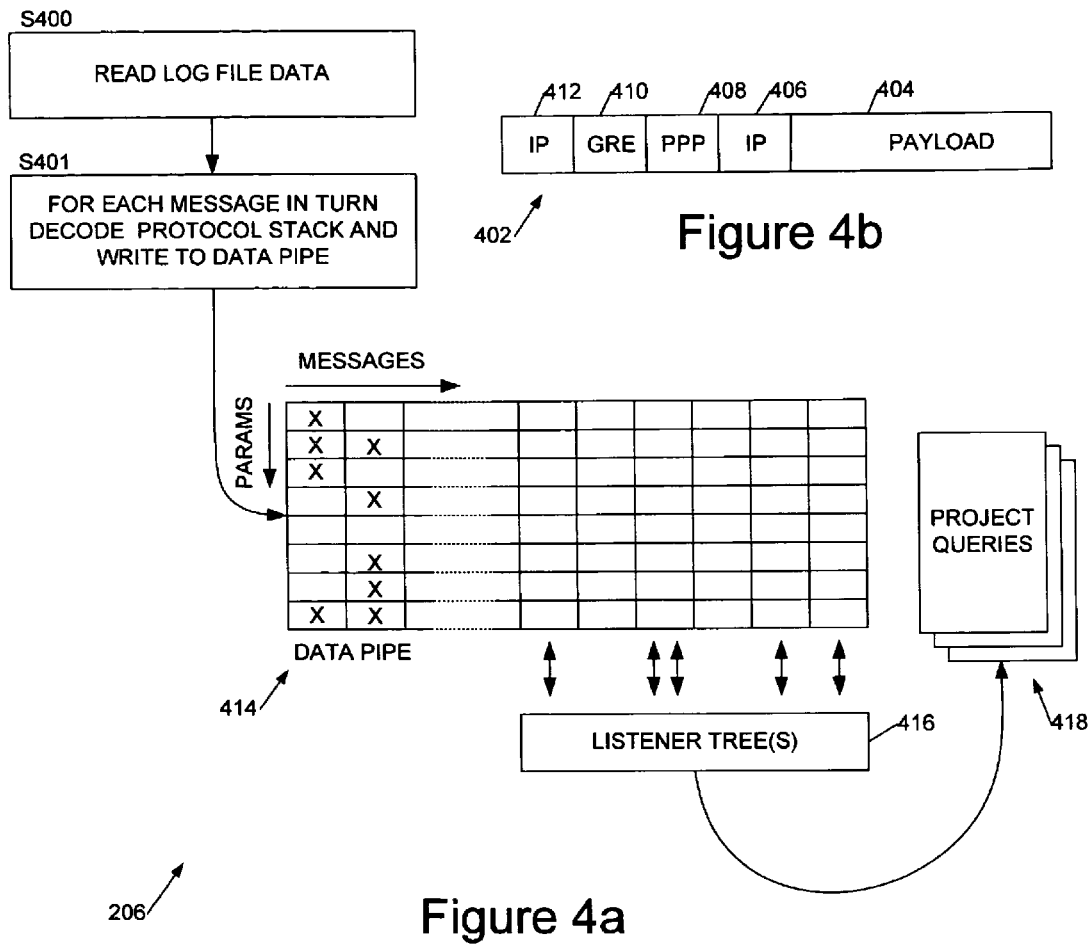
Figure 4b
Figure 4a
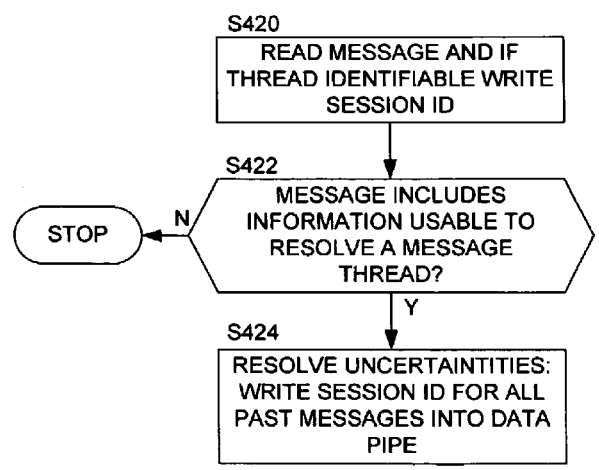
Figure 4c

Figure 5c

DATA STORAGE AND PROCESSING SYSTEMS

BACKGROUND

This invention generally relates to systems, methods and computer program code storing and processing data, in particular large volumes of data captured by monitoring digital mobile communications networks such as digital mobile phone networks.

FIG. 1 shows a simplified block diagram of a generic mobile communications network 100 such as a CDMA (code division multiple access), UMTS (universal mobile telecommunications system) or GPRS (general packet radio service) network. The terminology applied herein is not meant to imply limitation to any particular type of network.

Referring to FIG. 1, the network has a plurality of fixed base stations 102A-C referred to as base transceiver stations (BTS) or node B's each coupled to a respective base station subsystem 104A, B comprising a base station controller (BSC) or radio network controller (RNC) and a data packet control function (PCF) or packet control unit (PCU). Voice traffic is passed via a circuit switched connection to one or more voice switches 108 such as a Mobile services Switching Centre (MSC) and data traffic is passed via a packet switch connection to one or more packet switches 114 such as a PDSN (packet data switch node) or SGSN (serving GPRS support node). The voice switch(es) 108 connect via other core network elements 110 to a voice phone network such as PSTN (public switched telephone network) and the packet switch(es) 114 connect via further core network elements 116 to the Internet 118. Mobile stations 106A, B attach to one or more of the base stations.

The techniques we describe herein are useful for a range of networks including GSM (Global System for Mobile Communications) and GPRS but are especially helpful when storing and processing data captured from 3G mobile communications networks such as CDMA and UMTS networks. The terminology used for the different network elements varies depending upon the type of network and in this specification the use of particular terminology, for convenience, does not imply limitation to any specific type of network.

Generically the latest generation of telecommunications networks (3GI third generation) are encompassed by the International Mobile Telecommunications IMT-2000 standard which encompasses wideband CDMA (WCDMA) direct spread FDD (frequency division duplex) systems in Europe and Japan, CDMA2000 multicarrier FDD for the USA, and TD-SCDMA (time division duplex synchronous CDMA) for China. Further details of each of these specifications may be obtained by reference to the appropriate standards, which are the standards produced by the $3^{rd}$ Generation Partnership Project (3GPP, 3GPP2, hereby incorporated by reference. Examples of these, incorporated by reference, include TS23.101 (general UMTS architecture), TS25.101 (radio transmission and reception), TS23.060 (GPRS—General Packet Radio Service), TS25.433 (NBAP—Node B Application Part); TS25.331 (RRC—Radio Resource Control); TS24.008 (MM—Mobility Management); TS24.008 (CC—Call Control); TS25.322 (RLK—Radio Link Control); TS25.321 (MAC—Medium Access Control).

Referring again to FIG. 1, a large number of interfaces are defined of which some are shown, in particular the $A_{bis}$ (CDMA2000) or $I_{ub}$ (UMTS) interface 103 between a base station and a base station subsystem, and the $A_{quater}$ (CDMA) or $I_u$ (UMTS) interface 105 between a PCF/PCU and a packet switch 114. In a CDMA2000 system the $A_{quater}$ interface comprises an A10 interface used to provide a path for user traffic between a PCF and a PDSN, and an A11 interface used to provide a signalling connection between a PCF and a PDSN for packet data services. Other interfaces in a CDMA2000 system include the $A_{ter}$ interface comprising A3 (user traffic and signalling) and A7 (signalling) for handoff (in Europe called handover) between base stations, and the A8 (user traffic) and A9 (signalling) interfaces between a BSC and PCF for packet data services. The AS interface provide a path for user traffic for circuit-oriented data calls between a source base station (BS) and the MSC.

Various techniques are known for capturing data relating to the operation of a mobile communications network, depending upon the level at which the data is obtained. Generally mobile communication networks include an Operation and Maintenance Centre (OMC) (not shown in FIG. 1) which collects statistics from network infrastructure elements such as base stations and switches and compiles these into a database. This provides network operators with a high level view of the network performance and, for example, an OMC typically includes counters for every dropped call split out by cells and time. However, because OMC data comprises only high level statistics it is of limited usefulness in trouble shooting. For example OMC data cannot provide information relating to an individual communication session. Other high level data on how a network is performing can be obtained from call detail records (CDRs) and SS7 (signalling system number 7) data. At a lower level some diagnostic logs are available from individual items of equipment such as base station controller.

It is also known to tap a link or interface between infrastructure elements (either logical or physical) using a protocol analyser or IP (internet protocol) sniffer to record all the data flowing on such a link or across such an interface as a trace or log file. Such file can contain all the messaging between the two elements connected by the tapped link, for example all the messaging between a base station subsystem and a switch. However, there is a need for tools to extract useful information from such captured data.

At a still lower level a network may be tested by means of a simulated user "drive test" in which a mobile station is caused to establish calls in regular patterns to test a network. During these test calls a portable computer attached to the mobile stations gathers diagnostic information from the mobile, generally including air interface messaging, which is stored for later analysis. Alternatively diagnostic information may be incorporated into the test traffic stream so that this can be captured, together with associated signalling, from an interface within the network, as described further in the applicant's International patent application WO 03/047280, the contents of which are hereby incorporated by reference.

There is a need for improved diagnostic tools for mobile communications networks. For example, there is a need for techniques for handling and providing useful information from the vast quantities of data which may be captured at an interface of a mobile phone network.

In particular there is a need for techniques which facilitate the monitoring of a plurality of communications sessions in parallel, for example monitoring a plurality of simultaneous voice and/or data calls and parameters associated therewith to determine how a particular network entity such as a handset or base station controller, or a set of such entities is/are behaving, and whether or not the entities or more generally the network is operating correctly and/or in the most efficient manner. As previously mentioned high level statistical data of the type captured by an OMC is of little use in this task, whilst drive test systems are, broadly speaking, restricted to testing the behaviour of the network in relation to a single mobile device. However a stream of messages captured from a point within the network, typically one of the many interfaces defined in the network specifications, can provide information about the operation of a plurality of network entities, although to make good use of such information special techniques are desirable. For example in a UMTS mobile phone network special techniques may be needed to identify messages relating to a particular communications session within a stream of messages, for example to track a particular voice/data call, and such techniques are described in UK patent application no. 0322979.6 filed by the applicant on 1 Oct. 2003, the contents of which are hereby incorporated in their entirety by reference. Likewise specialised data mining techniques are described in the applicant's PCT application GB 2004/000262 filed 27 Jan. 2004, the contents of which are again hereby incorporated in their entirety by reference.

The applicant's earlier patent applications described techniques useful for call tracking and network monitoring in mobile communications systems but further improvements are desirable, in particular in connection with the processing time needed to handle many thousands of messages, preferably on a computer such as a laptop, and in the handling of certain specific technical problems relating to processing and obtaining information and/or statistics of dropped calls, timeouts, handovers, throughput and the like. Broadly speaking a common feature of these events is that one does not know that the event occurred until sometime afterwards, for example when a timeout indicates an earlier failure or when messages appearing in a steam turn out to be related to a subsequent handover of a call to, say, a particular base station (in UMTS this may be complicated by soft handover).

SUMMARY

According to a first aspect of the present invention there is therefore provided a method of storing data captured from a digital communications network, for processing, said captured data comprising a stream of messages having message parameters, said stream of messages comprising messages of a plurality of communications sessions, the method comprising: inputting data from said stream of messages; writing, for sequential ones of said said stream of messages, sequential sets of parameters into a first FIFO (first-in first out) data structure, at an entry point of said first FIFO data structure; reading said sequential sets of parameters from an exit point of said first FIFO data structure; and writing sequential sets of parameters read from said first FIFO data structure into a second data structure; and wherein said entry point and said exit point are separated by a first data structure length; and wherein said first data structure length has a predetermined minimum value defined in terms of a number of said sets of parameters and/or a time between said writing of a said set of parameters into said first data structure and said reading of a said set of parameters from said first data structure.

In embodiments in effect segmenting the overall data structure facilitates performing processing operations requiring a minimum time and/or number of messages to ensure that their output is valid, for example call tracking operations which may need to account to handovers (also called handoffs). Generally in such a segmented data structure the first FIFO data structure will be at the start of the overall data structure, but this need not be the case. In practice the FIFO data structure may be implemented by a circular buffer. The FIFO data structure preferably has one slot (or block) per message, each slot being configured to store a set of parameters. However the above references to sequential messages and to sequential sets of parameters includes both successive and non-successive messages (i.e. with and without "gaps") since, for example, certain types of messages, such as unwanted measurements, may be discarded. Preferably a FIFO slot is configured to provide a storage location for each of the possible parameters which it is desired to process at a later stage although in any one message only a few of these parameters may be present. This provides a sparse (and hence memory costly) data structure but one which facilitates rapid searching and access.

Preferably the second data structure is also a FIFO data structure although it may have a length of only one message. In practice a plurality of segments, that is plurality of chained FIFO data structures may be needed to define a plurality of segments of an overall data structure each of which provides a guaranteed minimum time (or number of messages) available for processing data within that segment (although not all the segments need define such a minimum processing time and in particular, the final segment will, in general, not).

One or more data processing modules may be attached to each segment of the overall data structure. As described further below broadly speaking in embodiments there is generally a need to output data relating to one or more user or system-defined parameters determined by processing network traffic/signalling information, for example to provide throughput information for a particular network entity such as a base station controller, or, say, to provide radio access of packet delay information for a particular handset or group of handsets. Broadly speaking these output parameters will define a tree of data processing operations so that, for example, a high level query relating to session statistics broken out by session may require lower level processing to implement a state model of events at, say, the A11 interface, which in turn may require implementation of a CDMA session tracker. These data processing operations are, in embodiments, implemented by so-called listeners attached to segments of the data structure. Where a listener dependency tree defines a priority between a group of listeners but there are no time (or number of message) critical operations then the group of listeners may all be attached at a common segment, generally all at the same slot of the segment (to ensure a consistent definition of a current message/set of parameters) and it is merely necessary to ensure that the listeners "fire" in the correct order, that is that the operations they perform are carried out in an order defined by the listener dependency tree. However where one or more of the listeners in the dependency tree require a minimum time (or number of messages) in order to guarantee a valid output then any listeners above such listener in the dependency tree (that is requiring an output from the listener) are attached at a subsequent segment, thereby ensuring that when these listeners come to carry out their respective operations they are operating on valid data. It will be appreciated that within a listener dependency tree there may be a number of operations which require a guaranteed minimum time (or number of messages) to provide a valid output in which case a number of segments (or FIFOs) is employed each of a suitable length to guarantee the minimum time required. The top of the listener tree will, in general, not comprise listeners requiring a minimum delay for a valid output (since this type of listener tends to be at a relatively low level) and thus at least the final segment or data structure may have a length of just one message (or may even be omitted). For efficiency of memory usage it is preferable that a minimum number of segments necessary to implement a dependency tree is defined, and this may be done by grouping listeners at a given level within the tree and determining a length for the associated segment (FIFO data structure) which is sufficient for the longest time (or number of messages) of the grouped listeners.

As previously mentioned generally the lowest level of the listener tree will include a communications session tracker. This may or may not require a minimum processing time/number of messages, depending upon the type of network from which data is captured, but generally for more complex 3G-type networks such a minimum guaranteed processing time will be necessary. Such a communications session tracker, in embodiments, outputs a parameter which is referred to here as a discriminator. Broadly speaking any parameter may be used as a discriminator, depending upon the communications session or thread it is desired to track. Here communications session is used generally to refer to part or all of the communications involving one or more network entities such as, say, communications between a mobile device and a base station and/or communications between a base station and a base station controller. One or more discriminators may be employed and where more than one discriminator is employed the discriminators may or may not be "orthogonal", that is identifying separate, non overlapping sets of messages. For example a particular packet session identifier may belong to only one IMSI (international mobile subscriber identify). A single message can have a plurality of discriminator values where a plurality of discriminators is employed.

As has been mentioned above, a segment of an overall data structure such as the aforesaid first FIFO data structure is configured to have a predetermined minimum length, most usefully in time. However in general messages captured from a network do not arrive at fixed intervals and the rate of data captured depends upon the level of network traffic, for example the number of handsets attached. Because of this variable data rate the FIFO data structure is preferably a dynamic data structure—that is it has a length, in terms of number of messages, which can change (or more particularly, grow) in order to guarantee a minimum available processing time. For example the data structure may begin with a relatively short length when parameters of a first message are written into the data structure and that may then grow as more messages are captured and more sets of parameters are written into the data structure until eventually, after, say, a predetermined time of one second the first message exits the data structure. The skilled person will recognise that such a structure may be implemented by means of standard coding techniques, for example using C++. For convenience, in preferred embodiments a data processing module or listener attached to the data structure writes its one or more output parameters into a storage location designated in each slot for such a parameter so that, at the exit point from the FIFO, the results of the earlier processing may conveniently be accessed together with a set of parameters for the relevant message, and these can then become "current" parameters for the next segment of the overall data structure.

Another concept which is facilitated by the use of a segmented data structure is that of what are here called data "buckets", that is stores for parameter data. Such a data bucket preferably comprises part of a data structure such as a FIFO data structure so that from the point of view of an object interacting with the data structure data held in a bucket is managed transparently. However a bucket may be thought of as being attached to the side of a FIFO. Preferably a data bucket is sufficiently large to hold a complete set of parameters from a slot or data block of the FIFO, in effect a superset of all those parameters required by listeners attached to the FIFO, but is preferably no larger for economy of memory usage. A data bucket preferably holds a last or (most recent) previous value of a parameter so that a listener has access to both a current value of one or more parameters (defined by the slot to which it is attached) and a last value of the one or more parameters. In embodiments this is sufficient to define a state of a network entity, for example as defined by a state model or state machine although, in embodiments, a parameter may comprise a parameter indicating a previous history of states or transitions within a state diagram. For some applications (listeners or parameters) a non-discriminated bucket is sufficient—that is the last value of a parameter stored in the bucket may be determined without reference to a communications session to which the parameter belongs. However in general it is more useful to implement one or more "discriminated" buckets, that is buckets which store the last value of a parameter of a communications session having a particular discriminator value or values. Broadly speaking, one such discriminated bucket may be provided for each communications session tracked so that, for each session, a current and last value of one or more parameters is available. Such a discriminated bucket may be implemented by updating the relevant discriminated bucket with current parameter data when a new message enters the data structure. In embodiments a listener attached to a particular slot or FIFO data block knows to which communications session or thread the message belongs and thus has "current" parameter value data for that session and can retrieve "last" parameter value from the appropriate discriminated bucket; once the message has been processed the "current" parameters are retired into the discriminated bucket ready to become new "last" parameters when the next message in the communications session or thread arrives for processing as a "current" message. Although with some protocols (generally at a higher level within a network), for example straightforward Internet Protocol or TCP (Transmission Control Protocol) it may be possible to track a session with a listener attached to, say, the first slot of the first data structure without any latency (so that a discriminated bucket may attached to, say, the first segment) in general for complex networks such as 3G networks a session tracking listener will require a minimum elapsed time or latency to provide a valid output. In such a case a session tracking listener may be attached towards or at the start of the overall data structure, thus defining a first segment such as the aforementioned first FIFO data structure, one or more discriminated buckets then being attached to the second (and optionally where present subsequent) segment or FIFO data structure. Storing current and last parameter values in this way can greatly simplify data processing such as state model/machine tracking, in particular where there may be a large number of concurrent sessions. In a preferred implementation the data buckets are implemented such that when a listener writes an output parameter value or values into a data structure slot the relevant bucket or bucket (discriminated or otherwise) are automatically updated with the relevant "last" value. It will be appreciated that although reference has been made to parameter value storage locations these may, in general, comprise storage for any type of data element such a scaler, vector, matrix, fixed array, sparse array, string or the like and/or one or pointers thereto. Preferably a single interface is prevented to a listener comprising the relevant current and last parameters. It will be appreciated, however, that in general not all listeners will be implemented using state diagrams since the determination of certain parameters, for example throughput (payload sum over time) need not rely knowledge of the state of a particular entity. Generally speaking higher level statistical data (referred to later as "queries") falls into this category although determination of such data may well rely upon knowledge of the state of a model/machine at a lower level in the listener tree. Broadly speaking one underlying concept is to in effect re-create the state of a network element by reading and understanding protocol messages on the network and controlling a state machine accordingly. When processing a stream of messages comprising a plurality of concurrent communications sessions a parallel bank of state machines is employed in conjunction with one or more discriminators so that, for any given message, one or more corresponding state diagrams is active. The implementation of this approach is simplified by storing previous or last values for all the parameters required by a state machine/model listener, preferably using discriminated buckets as described above to store previous state information indexable by a session identifier or discriminator. A state diagram for a network entity can be derived from the relevant network specification and can be expressed as compilable or executable code implementing conditions for moving from one state to another.

As previously mentioned the listeners attached to a segmented data structure depend upon the desired output parameters and, in general, defining one or more output parameters will define a listener tree based upon a set of listener dependencies. Listener dependencies may be expressed as parent-child relationships, a parent needing a result from a child, and this defines a relative ordering or priority amongst the listeners. Furthermore, again as previously mentioned, some listeners have latency requirements, one or more of such requirements in effect determining a segment break in an overall data structure. A set of listener priorities and a set (preferably a minimum set) of segment breaks is, in preferred embodiments, determined automatically according to an iterative procedure in which first one or more top level listeners are attached, followed by their necessary children, a form of bobble thought then being implemented so that parents are moved along the data structure and segments introduced for consistency with priority and minimum delay requirements.

The above described segmented data storage also facilitates other techniques for reducing a quantity of data to be processed, which are here referred to as culling techniques, that is techniques for reducing the quantity of data moving through the overall data structure. These culling techniques are preferably applied at segment breaks, for example between the aforementioned first and second data structures, and may comprise sampling/discarding and/or combining messages, or more specifically sets of parameters derived from messages.

In the preferred embodiments such culling may be implemented using a commit or culling listener attached to a portion of segment of a data structure and configured, for example, to identify messages or sets of parameters for culling and to set a flag in the parameter block or slot accordingly. Then when the message/set of parameters reaches the segment break a decision module can read the flag and, responsive to its value, determine whether a message/parameter set should be culled, for example discarded, or passed on to the next segment for further processing. In 3G networks large numbers of messages relate to measurements, for example measurements of a pilot channel and/or rake searcher/finger information. Culling such messages can significantly decrease the storage/processing requirements after culling.

The above described methods and architectures may be implemented in software and thus aspects of the invention further provide such software, in particular on a computer readable medium such as a disk, programmed memory (e.g., RAM), etc.

In a related aspect the invention further provides a system for processing data captured from a digital communications network to provide output data, the system comprising: a data pipe configured to store said captured data as a time-ordered sequence, said data pipe having at least a first region and a second region, said second region corresponding to earlier times than said first region; at least one first listener attached to said first region of said data pipe; at least one second listener attached to said second region of said data pipe; and wherein said a first listener is configured to read input data from said data pipe and to write first listener output data determined from said input data back to said data pipe, wherein at least some of said first listener output data is not valid until after a delay; wherein a said second listener is configured to read second listener input data including said first listener output data from said data pipe, and to provide output data determined from said read second listener input data; and wherein a start of said second region of said data pipe is earlier than a start of said first region of said data pipe by at least said delay.

In embodiments the system comprises a computer system including an input to receive the captured data, data memory to store the captured data and, in particular, to implement the data pipe, program memory storing processor implementable instructions, and a processor coupled to the data memory and to the program memory to load and implement the instructions to provide said data pipe and said first and second listeners.

In embodiments of the above system the captured data is input to the first region and then later arrives at the second region so that the second region corresponds to earlier (older) times. The data pipe preferably includes one or more buckets and in this case the output data may be written back into these buckets (and/or otherwise into reserved memory locations in the type). As previously mentioned a listener comprises a data processing module and may take a variety of forms including a session tracker, a module to determine one or more statistics relating to captured data, and/or a state model or machine representing an entity. The delay may comprise a minimum number of messages but preferably is defined in terms of a time interval and in this case, where a rate of captured data storage into the data pipe is variable, the length of the first region (in terms of numbers of messages/sets of parameters) may also be variable. As mentioned above, listeners are preferably attached to the data pipe or configured to "fire" (i.e. operate to implement a processing operation) in accordance with a listener dependency or dependency tree. Generally the captured data will comprise a stream of messages some of which will be specific to particular communications sessions (others may be more general measurements/signalling messages) and in this case at least one of the first listeners may include a listener to identify one or more communications sessions and to write corresponding session identity data back into the data pipe. Preferably at least one data bucket is associated with each communications session from which it is desired to capture and process data, and these buckets may then be selected using the session identity data in the data pipe (in simple networks a bucket may be selected on the basis of data read directly from a captured message).

In another aspect the invention provides computer program code for processing data captured from a digital communications network, said captured data comprising a stream of messages, ones of said messages including message parameters, said stream of messages comprising messages of a plurality of communications sessions, the code comprising: a first FIFO module having an input for receiving message parameter data from said stream of messages and an output; a second FIFO module having an input coupled to said first FIFO module output; and wherein said message stream has a variable rate and wherein said first FIFO module is configured to guarantee a time delay between said first FIFO input and said first FIFO output of at least a minimum value.

The invention also provides a method of processing data captured from a digital mobile communications network, the data comprising a stream of messages relating to a plurality of entities of said network, the method comprising identifying and labelling data relating to unwanted messages; and subsequently reading said labelling and culling said data relating to unwanted messages.

The invention further provides computer program code, in particular on a computer readable medium, to implement this method.

Thus the invention provides computer program code, for processing data captured from a digital communications network, said captured data comprising a stream of messages having message parameters, said stream of messages comprising messages of a plurality of communications sessions, the code comprising: a first FIFO module having an input for receiving message parameter data from said stream of messages and an output; a second data processing module, in particular a FIFO module, having an input coupled to said first FIFO module output; and a data culling module coupled between said first FIFO output and said second data processing module input to reduce a rate of data processed by said second data processing module compared with said first FIFO module.

As previously mentioned, in preferred implementations a data storage structure suitable for a particular listener tree required to provide a desired set of output parameters is defined automatically, working backwards from the output parameters to determine the listeners required and from there in an iterative process to position listeners to enable their parent-child relationships to be satisfied and to, where necessary, provide a minimum necessary output validation time, these listener positions then effectively defining a set of segments for a data structure. In embodiments where possible listeners which can be attached to the same segment are and if necessary a segment length is increased to a maximum required guaranteed minimum validation time; likewise listeners without such an associated validation time are preferably attached at the same point on the data structure, preferably at the start of a segment.

Thus in accordance with a further aspect of the present invention there is provided a method of defining a data storage structure, the data storage structure comprising one or more FIFO structures coupled in series, at least one of which has a guaranteed minimum length, one or more data processing modules being couplable to each said FIFO structure to receive data from the structure, the method comprising: inputting a required parameter set; determining a set of data processing modules required to provide said required parameter set, one or more of said modules having a minimum required time for a valid output, others of said modules being dependent upon a said valid output; and positioning said data processing modules on a said data storage structure to define a said structure in which a said FIFO with a guaranteed minimum length is defined by a said module with a minimum output validation time, and a subsequent series coupled FIFO is defined by a said module dependent upon said valid output.

In embodiments the positioning and/or the determining of a set of data processing modules comprise iterative procedures. The structure definition may be provided as an output data file, for example an XML (extended markup language) file defining a segment configuration for the data storage structure. Such an approach increases the versatility of the data storage/processing and, for example, avoids a need for a rebuild of code defining a storage structure each time a set of output parameters is changed.

The invention also provides a method of storing data captured from a digital communications network for processing, said captured data comprising a stream of messages having message parameters, said stream of messages comprising messages of a plurality of communications sessions, the method comprising: inputting a said message of said stream; writing a set of parameters from the message into a FIFO data structure identifying a communications session to which the message belongs; and updating a last value data store associated with the communications session with parameters of a previous message of the session.

The invention further provides a method of processing data stored in accordance with the above described technique, the method comprising determining, for a said communications session, a current value and a last value of one or more of said parameters, from a current message and a said last value data store, and processing said current and last value to provide an output value.

Preferably the processing implements a state model or machine.

In another aspect the invention provides computer program code for storing data captured from a digital communications network for processing, said captured data comprising a stream of messages having message parameters, said stream of messages comprising messages of a plurality of communications sessions, the code comprising: a buffer module to sequentially store said messages; a discriminator module to associate said message with a communications session; and a bucket module, responsive to said discriminator module to store a most recent previous value for one or more of said message parameters for each of a plurality of said communications sessions.

The invention also provides a method of modelling a plurality of communications sessions or network entities substantially in parallel using data captured from a digital communications network, said captured data comprising a stream of messages having message parameters, said stream of messages comprising messages of a plurality of communications sessions, a said communications session comprising messages communicated by or to a said network entity, the method comprising: storing, for each said session or entity, a most recent previous value for a parameter set comprising one or more of said parameters; determining, for a current message, a communications session or entity to which the message belongs; determining one or more current parameter values from said current message; updating a state model for said communications session or entity to which the message belongs using said one or more current values and said most recent previous parameter set value for said communications session or entity; updating said most recent previous value parameter set using said one or more current parameter values; and repeating said determining and updating to model said plurality of communications sessions or network entities using a parallel bank of said state models, one for each said session or entity.

In embodiments of this method the determination of the session or entity to which a message belongs may determine a discriminator such as call identifier which indexes a state machine modelling the session/entity. The current and most recent previous (that is last) parameter values may then be used to determine an updated state for the session/entity, in preferred embodiments the session/entity associated with the current message being updated. In this way a plurality of communications sessions/entities may be modelled concurrently. A state model for a session/entity may be created and/or removed as or when necessary, for example when a new communications session starts or an existing communications session ends. In embodiments of this method the plurality of network entities comprises a plurality of instantiation of a single type of network entity, such as a plurality of handsets or a plurality of base stations.

The above-described data structures, systems and methods facilitate storage and processing of data from a range of mobile communications networks by providing generalised storage and processing techniques which can be adapted for use with a particular network such as CDMA or UMTS by the addition of a suitable front end to decode a protocol stack used by the network to extract values for message parameters.

The skilled person will understand that the above described methods and systems will generally be implemented using computer program code thus the invention also provides such computer program code, optionally on a data carrier, and also computer systems including this code. The code may be written in any conventional programming language, for example Visual C++ or a lower level language, and may be distributed between a plurality of coupled components in communication with one another, for example in a distributed net, network-based computer system. In preferred arrangements the code comprises a number of separate, communicating code modules rather than a single large program, for ease of maintenance.

Embodiments of the above-described methods may be implemented on standard computer hardware by installing software embodying aspects of the invention. The data carrier carrying the program code (e.g., computer executable instructions) may comprise a non-transitory computer readable medium, such as a disk (CD- or DVD-ROM), programmed memory such as read only memory (firmware), volatile or non-volatile random access memory (RAM), etc. However, the data carrier cannot be implemented as pure electrical signal. The program code (e.g., the computer executable instructions) can be accessed and executed by a processing unit (e.g., one or more computer processors).

These and other aspects of the invention will now be further described, by way of example only, with reference to the accompanying figures in which:

BRIEF DESCRIPTION OF THE DRAWINGS

FIGS. 4a to 4c show, respectively, a network message storage and processing system, a message protocol stack, and a flow diagram of a CDMA session tracking procedure;

FIGS. 5a to 5c show respectively, examples of state diagrams for a CDMA network interface, and for a mobile handset, and an example of radio link setup signalling messages;

FIGS. 7a and 7b show, respectively, a data storage and processing system embodying aspects of the present invention, and a flow diagram of a procedure for configuring the system of FIG. 7a; and FIG. 8 shows a block diagram of general purpose computer system which may be employed to implement the data storage and processing system of FIG. 7a.

DETAILED DESCRIPTION

Figure 1:
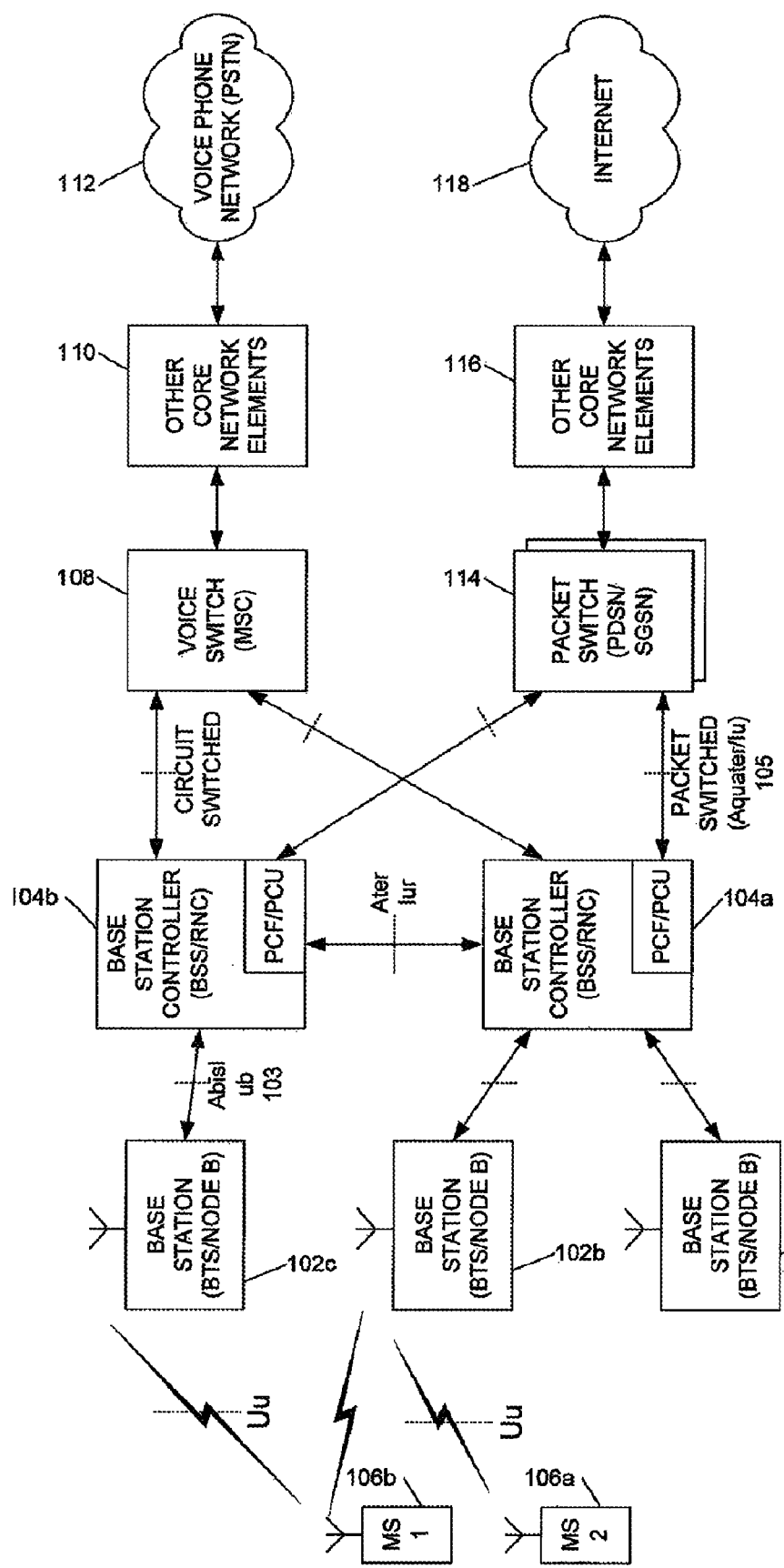
FIG. 1 shows a portion of a generic mobile telecommunications network.
Figure 2:
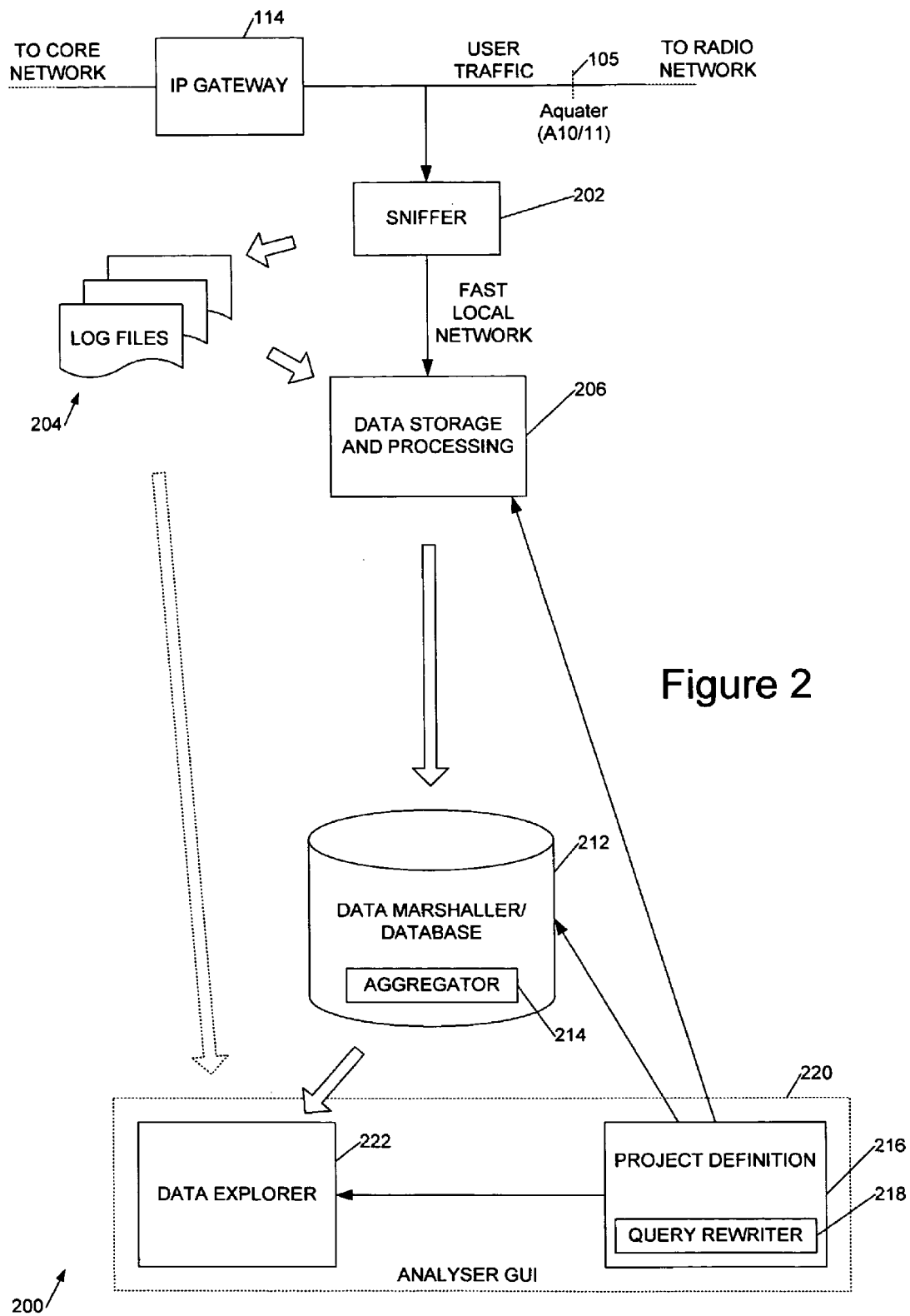
FIG. 2 shows a block diagram of a network monitoring system.

FIG. 2 shows a network monitoring system 200 similar to that previously described in the Applicant's international patent application no. PCT/GB2004/000262 filed 27 Jan. 2004, the contents of which are hereby incorporated by reference in their entirety. As illustrated the system is being employed to capture user traffic (A10) and signalling (A11) information from the $A_{quater}$ interface 105 of FIG. 1 although in other embodiments similar systems may be employed to capture data from other interfaces in the generic network of FIG. 1. The data across interface 105 comprises data exchanged between the core network (to the right of the interface in FIG. 1) and the radio network (to the left of the interface in FIG. 1), tunnelled within IP (internet protocol) data packets at typical data rates of between 1 Mbps per second and 1 Gbps per second; further details of the protocols employed are given later.

In the illustrated embodiment data packets crossing interface 105 are captured by a software sniffer 202, for example comprising a general purpose Unix or Windows (trademark) computer system running appropriate software such as TETHEREAL™, a free network protocol analyser or one of the several products available from NETWORK ASSOCIATES® of Santa Clara, Calif., USA. The skilled person will be aware that there are many other commercially available network protocol analysers. Sniffer 202 captures data packets from the network and writes this data to one or more log files 204, sometimes called "trace" files, generally stored on a local hard disk of the sniffer 202. Such files may be very large and may contain substantially all the messaging between the two elements connected by a link or interface being tapped (although in practice the occasional message may be missed).

A sniffer or protocol analyser may also decode a protocol stack of the packets it captures. In CDMA-type systems standard internet-related and tunnelling protocols are employed such as PPP (Point to Point Protocol, RFC 1548, 1549, 1332, 1333, 1334, 1551, 1376, 1377, 1378), and GRE (Generic Routing Encapsulation, RFC 1701/2) and hence standard protocol analysers can be employed. More specialised protocol analysers are generally required for GPRS and UMTS networks and the main manufacturers of these are NetHawk Oyj in Finland (NetHawk 3G series of products) and Tektronix, Inc of Oregon, USA (for example the K1297); other manufacturers of protocol analysers include Agilent, and Edixia of Telecom Technologies, France (for example the GSM/GPRS and UMTS Ocean instruments). Protocol analysers from these manufacturers can capture ATM (Asynchronous Transfer Mode) data and also provide a degree of protocol stack decoding.

We have previously described, in PCT '262 how the message data may be split into a set of session files, one for each concurrent communications session carried by interface 105 by tagging each message in a captured stream either with a session identifier (when this can be assigned) or with a temporary identifier for a thread with the aim of resolving the temporary identifier at some later stage when data allowing a message in a thread to be assigned to a session is captured. Data in the session data files may then be processed to generate statistics and/or chart or map data for later analysis. These statistics can be based upon the traffic, for example to measure throughput, and/or captured signalling, for example to count events such as successful/failed acknowledgements. A message browser may be implemented to allow drill-down into these individual data sessions to examine the captured traffic and/or signalling, for example to determine which particular website or sites are being accessed in an HTTP session or to investigate a series of messages associated with a failed radio link setup request in order to locate and address network or related problems.

Desired statistical data and/or other high level output data may be defined by one or more queries constituting a "project". The captured data may be automatically processed in accordance with the queries to generate relatively low rate statistical and other data, which may then be provided to a data marshaller or database 212. The statistical data may comprise low level statistics such as sums and counts which are stored in tables indexed, for example, by one or more message parameters. Each parameter may then act as one dimension of a potentially multi-dimensional view of the captured data, thus allowing statistics relating to the captured network data to be viewed according to sets of one or more dimensions and rolled up in the "unwanted" dimensions. This approach allows statistical data to be filtered and combined so that it can be viewed by first one set of parameters and then a different set of parameters, for example to first view the data by, say, network element (BS, BSC, MSC, PDSN and the like) and then by, say, a user-related parameter or parameters such as IMSI (international mobile subscriber identity), session, and/or time. To allow statistical data from a plurality of separate sessions to be combined, the database 212 may store intermediate or aggregatable statistics comprising an intermediate level representation of a desired set of statistics represented, for example, by a project or query, as described further in PCT '262. For example, a requirement for an average value is re-written as a requirement for a sum and a count so that two averages can be combined by adding the two sum values and adding the two count values and then dividing the total sum by the total count. Database 212 may therefore include an aggregator 214 embodied, for example, as program code comprising part of the database, the function of which is to automatically aggregate intermediate level statistics into a desired output statistic. The initial conversion of a desired statistic to statistics as defined by a query may be performed transparently by a query re-writer 218 within a project definition code module 216. Database 212 may also include a link to captured raw message data to enable drill-down. Database 212 may be accessible via a client computer system 220, comprising a project definition code module 216 and query re-writer 218, and a front end interface to the database 222, here termed a data explorer, to provide a graphical user interface (GUI) for data output from database 212 and optionally to allow drill-down to raw message data The project definition module 216 allows a user to define a "project" preferably using a set of templates. A project comprises a set of queries and each query has associated with it one or more data tables, each table comprising one or more parameters or "dimensions" and optionally corresponding (intermediate) statistics. Associated with a set of queries making up a project is preferably a set of reports which a user is able to design and generate.

Here we will describe alternative data storage and processing techniques in which instead of the captured data being split into a plurality of different session files, one for each concurrent communications session, a common data storage architecture is employed to process data of a plurality sessions effectively in parallel. In FIG. 2 these techniques are implemented by data storage and processing block 206.

Figure 3:
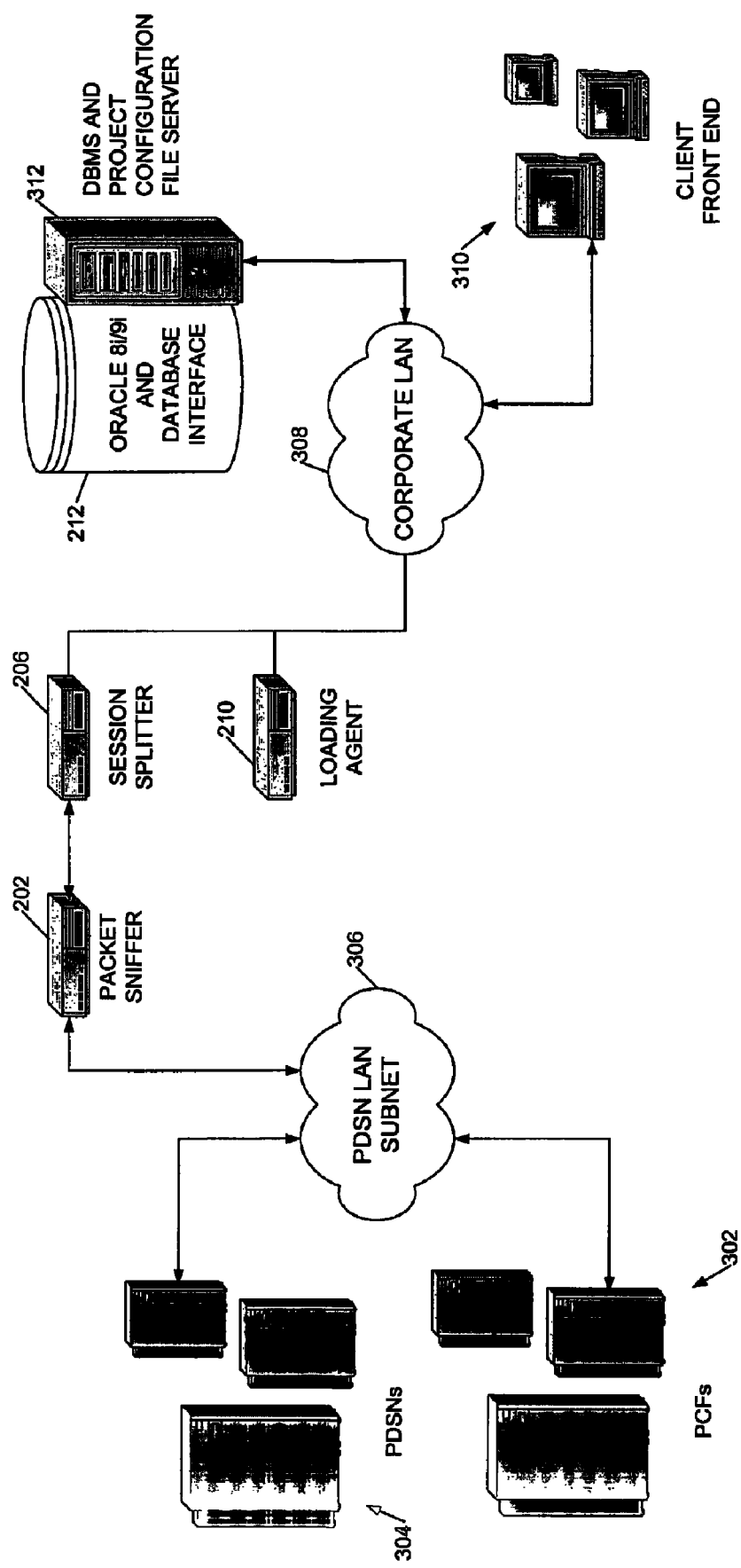
FIG. 3 shows a hardware architecture for the system of FIG. 2.

FIG. 3 shows a hardware architecture 300 which may be employed to implement a system embodying aspects of the present invention. Referring to FIG. 3, a plurality of PCFs 302 is coupled to a plurality of PDSNs 304, typically at the same location as the PCFs, by means of Ethernet connections to a PDSN LAN (local area network) subnet 306. The packet sniffer appliance 202 also connects to this subnet and provides captured packet data via Ethernet to a loading agent 210 and thence to a corporate LAN 308. Loading agent 210 implements the data storage and processing 206 of FIG. 2 and may comprise, for example, a Windows (trademark) computer system with a 2.8 GHz P4 processor, 1 Gb of memory, a 100 Mbps Ethernet link and a 100 Gb+ hard drive. Also connected to corporate LAN are one or client front end computer systems 310 and a database management system (DBMS) and project configuration file server 312 with code to provide an interface to, for example, an Oracle (trademark) 8i/9i Professional database. The client front end systems host project definition and data analysis presentation code as previously described and may comprise any conventional general purpose computer system. Likewise the Oracle DBMS file server may comprise a conventional computer system such as a Windows (trademark) or Linux (trademark) computer system with, for example, a 100 Gb hard drive, 1 Gb RAM and a 100 Mbps Ethernet card.

FIG. 4a shows an overview of the operation of data storage and processing block 206. Initially, at step S400, a data preprocessor reads captured packet data from a log file (which comprises a time-ordered sequence of messages) and, at step S401, decodes the protocol stack message by message to read traffic and/or signalling parameters therein. These parameters are written into a data pipe 414, which comprises a time-ordered sequence of message stores, each message store having storage locations for a plurality of parameters. The plurality of parameters preferably comprises all those parameters which may be encountered in a captured message together with additional parameters which may be determined by listener functions (as described below) and written into the data pipe.

In CDMA type systems such as CDMA2000 variants it is straightforward to decode the protocol stack by reference to the previously mentioned RFCs (requests for comment), which generally include sample decoders (hereby incorporated by reference). In other networks, for example UMTS networks, the protocol stack may be at least partially decoded by the protocol analyser used to capture the data; further details of protocol decoding in UMTS networks are given in UK Patent Application No. 0322979.6 filed on 1 Oct. 2003 in the name of Actix Limited, the contents of which are hereby incorporated by reference.

For example, FIG. 4b shows a protocol stack for data captured from the $A_{quater}$ interface of a CDMA-type network. Each data packet 402 comprises a payload 404 of user data such as email data, image data, FTP data or streamed media data within a IP layer 406 for communication between a mobile station and, say, a web site. To this is added a PPP header 408 for communication between a mobile station and a PDSN and on top of this is added a GRE protocol 410 and a further IP protocol header 412 which controls communication between a PDSN and a PCF. In some instances further tunnelling may be included within payload data 404, for example to provide a virtual private network (VPN) using HTTPS (hypertext transfer protocol secure).

This preprocessing enables implementation a common data storage/processing core, the pre-processing front-end being adapted to the protocols of a particular application. Broadly speaking the preprocessing receives a bit or packet stream input, cuts this into messages, and then extracts parameter values from the messages.

In overview the data pipe 414 comprises a plurality of storage locations for storing a plurality of captured messages in time order, the messages entering the data pipe at a starting point and effectively propagating down the pipe to an end point (although in practice the data pipe is preferably implemented using one or more circular buffers).

A session track module is employed to identify a communications session thread, for example by picking up the start and end of the thread. A plurality of such modules may be employed to track a plurality of sessions, or a single module may track a plurality of sessions in parallel. The session tracking module preferably comprises a listener attached to the data pipe 414 to allow session identification data to be attached to messages (i.e. sets of parameters) in the pipe. However it is not always possible to immediately assign a message to a particular communications session and it may be necessary to temporality allocate a session identifier to a message and then resolve the temporary allocation when a later received message allows this to be done, and there can therefore be a delay before a valid session identifier can be allocated to a message.

For example, consider a handover from a first base station to a second base station. Before the handover takes place a communications session thread starts on the second base station but it is not until the handover actually occurs that this can be associated with an existing communications thread involving the first base station. When monitoring at the $A_{bis}$ interface it can take up to around one second for an apparently new communications session thread to be resolved as a handover from an existing thread on another base station. The thread on the first base station may also continue for a short period after the handover whilst the link with the first base station is torn down.

For example, for a CDMA-type system $A_{quater}$ interface, a session tracking module may be implemented as shown by steps S420-S424 of FIG. 4c. Thus at step S420 the session tracking module reads a message and if the message belongs to an identifiable thread, for example because it includes a TCP packet sequence number linking it to an already received packet, then the session tracking module writes a session identifier into a memory location in the data pipe associated with the message. Otherwise, at step S422, the procedure determines whether the messages includes information useable to resolve a message thread, that is information characteristic of an individual communications session which may be used to link messages or sets of messages into a common thread. Examples of such information include an IMSI, and network assigned identity, two messages with the same IMSI, say, being presumed to belong to the same communications session thread. If no such information is found the procedure stops, otherwise, at step S424, the procedure writes an identifier for the session into all messages in the thread which are linked by the information in the most recently processed message, in particular including those in the thread which have already passed the session tracking listener window. Further messages received by the session tracking listener are allocated the now determined session identity.

Details of tracking sessions in a UMTS network are given in the applicant's UK Patent Application No. 0322979.6 filed 1 Oct. 2003, hereby incorporated by reference, which describes in particular call or session tracking at the Iub interface.

The basic concept described in the above patent application involves assigning a first session identifier to at least one message having a first signalling parameter; assigning a second session identifier to at least one message having a second signalling parameter; identifying a message having both said first and said second signalling parameters; and identifying messages of the communications session by linking said at least one message having the first session identifier and said at least one message having the second session identifier using said message having both the first and the second signalling parameters.

The first and second signalling parameters need not always be present in each message but providing the messages can be grouped into sets and linked by at least one message with both these parameters in effect chains may be extended forwards and backwards from the message with both parameters to identify messages associated with a particular communications session or call. These messages may then be output, for example to a file, either grouped according to the session or call identity or, as a time-ordered sequence with a call or session identifier accompanying any signalling parameters read from the messages. The messages may comprise or be derived from data packets or ATM (asynchronous transfer mode) cells, and an ATM virtual connection identifier may be employed as the first signalling parameter, depending upon which messages are to be linked.

Some messages may be assigned the first session or call identifier and some the second session identifier even though all these message may belong to a single session or call and thus when the two sets of messages have been linked this effective ambiguity may be resolved by converting one identifier to the other, for example by giving all messages with the first session identifier the second session identifier. The first and second session identifiers may be managed by making one, say the second session identifier, positive and the other negative. For example, messages may be logged against a negative call identifier (which could relate to a new call, or to an ongoing call or to a call involved in a handover/handoff) procedure) until a later message allows the negative call identifier to be linked to a positive call identifier (although sometimes, for example where at the start of a logging session a call is ongoing, such a link may not be available). In UMTS identifying special case messages allows messages on the two stacks (NBAP and RRC) to be linked. In a UMTS network the linking of sets of messages may be indirect so that, for example, the message having the second signalling parameter may also possess a third signalling parameter so that assigning the second session identifier to this message also associates this identifier with the third signalling parameter. For example, in a UMTS network the second signalling parameter may comprise a scrambling code (SC) such as a long or up link (UL) scrambling code and the third signalling parameter may comprise an RNC identifying parameter (sometimes referred to as a CRNC identifier or more precisely as a CRNC communication context identifier when the parameter identifies a communication session or communication context associated with the RNC rather than the RNC itself). Then when, for example, the first signalling parameter comprises a packet TMSI (temporary mobile subscriber identity) associated parameter the CRNC may be assigned a second session identifier, which is also associated with a scrambling code and for which, at some point, there is expected a connection setup message including both the scrambling code and the packet TMSI associated parameter.

Tracking calls on a circuit or packet switched Iu interface in a UMTS network is considerably more straightforward than tracking calls on the Iub interface. At the Iu interface each message has either one or other of a Source Local Reference (SLR) and Destination Local Reference (DLR). Thus a single table may be employed to link an SLR to a DLR and, optionally, to an ATM connection identifier comprising ATM parameters VPI (virtual path identifier), VCI (virtual channel identifier), and CID (channel identifier).

Where the log files are fragmented or where data capture begins in the middle of an existing communications session so that network signalling for example between a PDSN and a mobile device or other network element, setting up the communications session is missed it may not be possible to properly allocate a session identifier.

As previously mentioned, a session tracking module may comprise a listener but in general to provide the required output data a hierarchical tree in listeners will be required. Thus one or more listener trees 416 is generally attached to the data pipe 414, a listener tree comprising one or more listeners each determining one or more parameters from messages in the data pipe. Higher level functions may utilise the results from one or more lower level functions (which may be written back into the data pipe) thus defining a tree structure. Higher level listener functions requiring previously determined results are attached at a later position in the data pipe than the listener functions determining the results upon which they rely. A set of output data parameters provided by a set of listeners constitutes a project query and, in general, there may be a plurality of project queries 418. Further details of project queries are described in PCT '262.

In embodiments there may be a standard set of listeners and provision for further, user-definable listeners. In a general case a listener computes a function or expression which depends upon one or more parameters, here termed "dimensions"; a dimension or parameter may itself comprise an expression. In embodiments dimensions can include PDSN, cell (base station identity), BSC, PCF, MSC, source/destination address (internet destination website), subscriber (IMSI), session ID, downlink (DL)/uplink (UL), date and/or time (t) and expressions, for example t mod 3600 (i.e. time in hours), and session ID+10. Examples of statistical output parameters a user may wish to compute include most popular (mode), average (mean), last value, first value, count, count distinct (for example the number of distinct IMSIs or users, say per PDSM), some (for example total throughput per BSC) and the like.

Listeners can also determine statistics such as throughput, for example TCP throughput, either by waiting for an end of session acknowledgment or by defining an arbitrary end point and then using a count of the number of packets transferred in a session to determine throughput. It will be appreciated that throughput is another example of a parameter which is only validly available for a particular string of messages at the end of the string and hence after a predetermined delay. A similar consideration applies to a timeout which, if it is to be associated with the event causing the timeout, is only linkable to the event after waiting long enough for the timeout to have occurred. Thus a timeout detecting listener is another example of a listener which requires a minimum time for its output data to be valid. Again similar considerations apply to a listener configured to detect a dropped call. One might also imagine a listener to determine call length would also require a minimum time for its output to be valid but this time would be long compared, for example, to a typical timeout interval of one to a few seconds, and even then there will be no guarantee that a call would end within the minimum specified time. Instead it is therefore preferred that call duration is determined at a higher level by a query based upon a call start time parameter stored into the data pipe by a call start event detecting listener so that a call duration can be determined when a call end event is detected. More particularly a "last" value of call start time for a communications session (as described further below) may be employed to determine a call duration.

In preferred embodiments one or more listeners is also provided for implement an event engine, that is a finite state model or machine which tracks the state of a communications session, call or network element by monitoring messages for signals indicating transitions between states, for example a transition between a dormant state (say with no RF link) and an operational state. Such a state machine may be constructed, for example, from a network specification since a state diagram is formally equivalent to a sequence diagram and information effectively defining such a diagram is published, for example, for the A10 and A11 interfaces in 3GPP2 A.S0017-A Version 2.0.1 (3G-105v.4.3) July 2003 Interoperability Specification (IOS) for cdma2000 Access Network Inferfaces—Part 7 (A10 and A11 Interfaces), hereby incorporated by reference. Alternatively such a state diagram may be constructed by monitoring transitions between states, that is events, which actually occur at a network interface or in a network element by reading captured messages, including, for example, error conditions which may not be defined, or fully defined in a formal specification. It will be appreciated that details of a state model may vary from operator to operator.

Figure 5A:
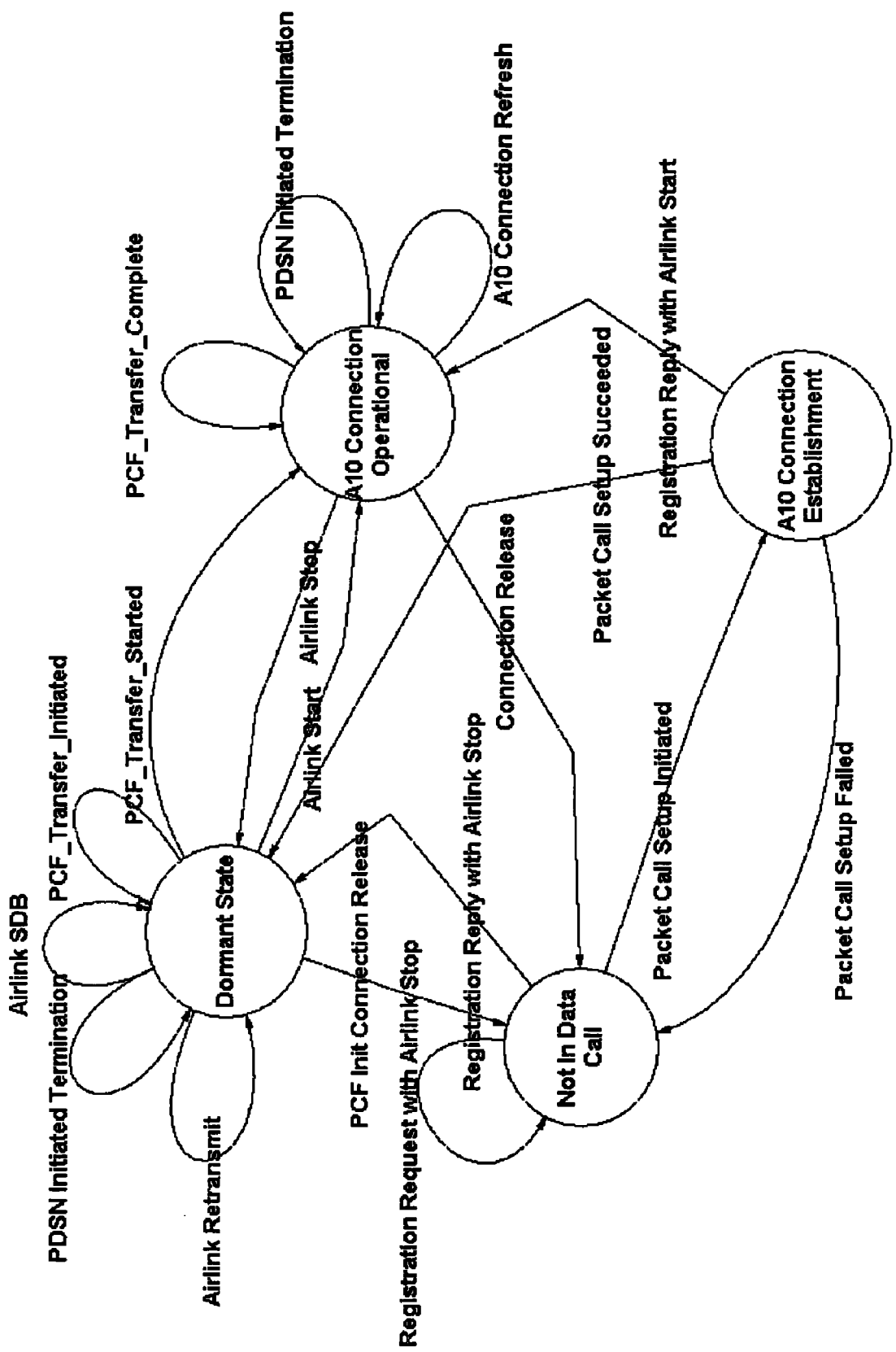

FIG. 5*a* shows an example of a state diagram for an A11 interface which, as the skilled person will understand, may be implemented by a finite state machine and tracked by an event engine listener to determine states of the interface. This information may then be used for further analysis. In preferred embodiments a state diagram or model such as that shown in FIG. 5*a* is defined in program code in such a way that it is effectively executable—that is so that providing a previous or "last" state is defined together with a current parameter or set of parameters the model will indicate to which state a transition is made (if at all). Thus in the diagram of FIG. 5*a* each directed line connecting one state to another is associated with a condition, that is a Boolean expression or set of expressions which can be evaluated to determine whether a transition from a previous state will take place. The skilled person will appreciate, however, that such conditions may be complex, for example requiring a message of a certain type in combination with a parameter or set of parameters having specified values or ranges of values.

Thus, for example, A11 states which may be detected include a Not in Data Call state, an A10 Connection Establishment, an A10 Connection Operational state, and a Dormant State. At this interface time stamped events which may be detected include signalling events such as Packet Call Set Up Initiated, Packet Call Set Up Failed, Packet Call Set Up Succeeded, and Connection Release as well as application events such as "user clicks on HTTP link" and "web page finished downloading".

Figure 5B:
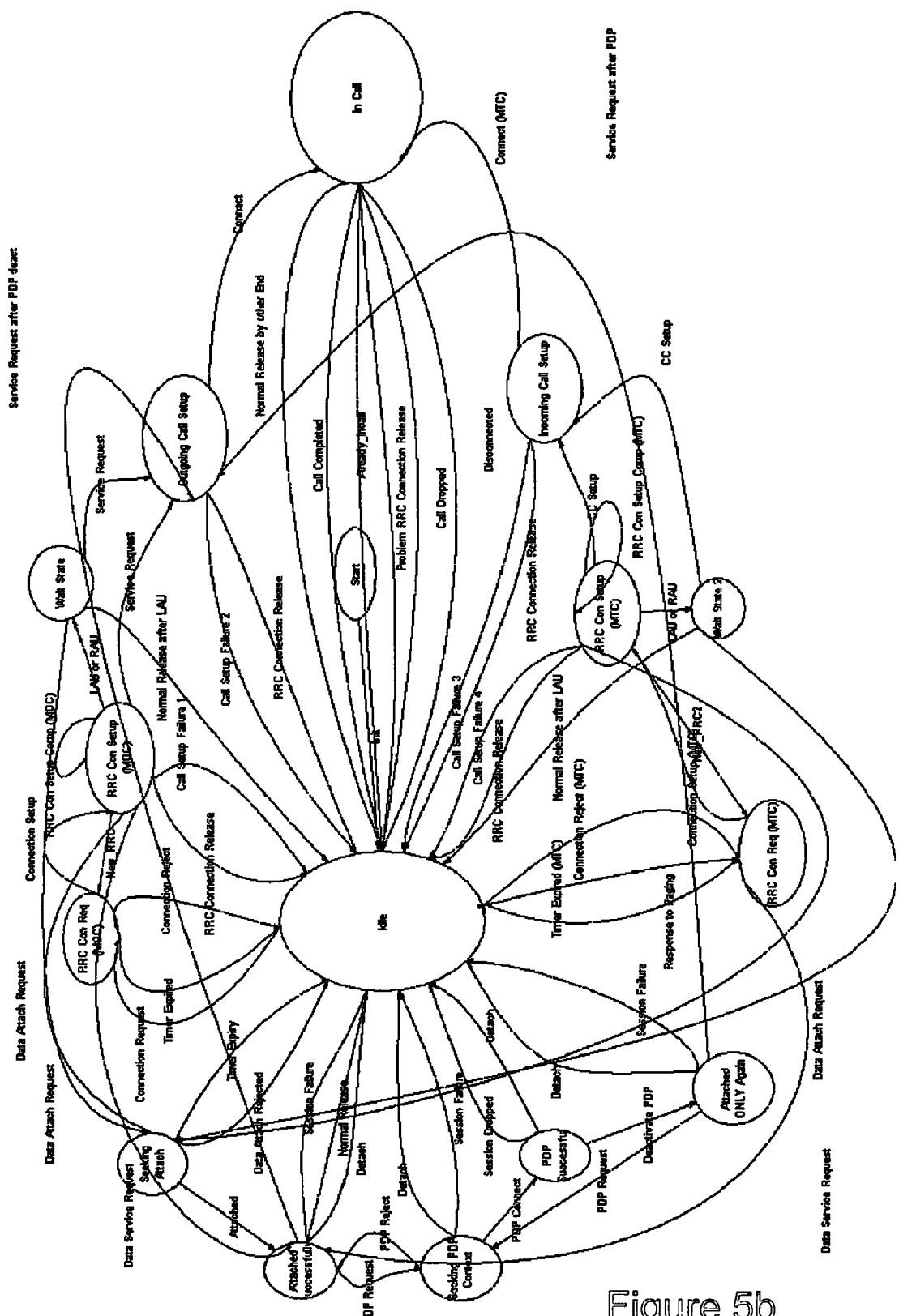

FIG. 5*b* shows an example of a state diagram for the UMTS RRC (radio resource control) stack of a handset, illustrating states involved in the setup of a radio link for a call. This is included as an illustration of a particularly complex state machine/model which may be implemented by an Event listener.

Figure 5C:
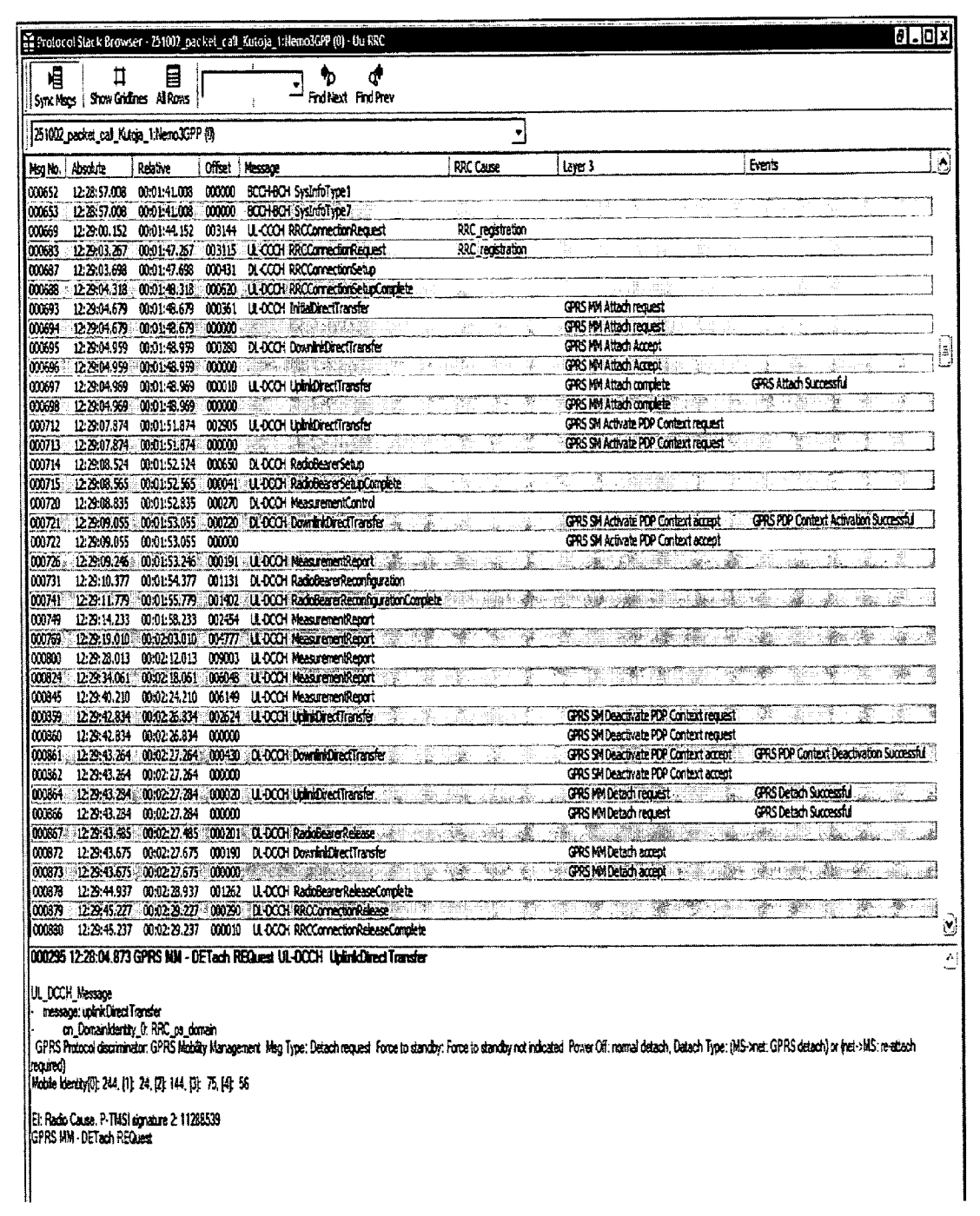

FIG. 5*c* shows an example of a stream of signalling messages captured from interface $G_b$ in a GPRS mobile communications network, and relating to radio link setup and the establishment of a data session. Messages of such a captured stream may be read and mapped onto a state diagram such as those shown in FIGS. 5*a* and 5*b* so that as each message is read a current active state of a communications session or entity moves around the diagram (which are encoded based upon state and transition condition information as previously described).

Data relating to these states and/or events may be evaluated at higher levels as multi-dimensional data sets including, for example, percentage packet call set up failures, set up time distribution, and time to download web page statistics, broken down (or rolled up) by dimensions such as cell, PDSN, internet destination, subscriber, session and the like. At the A10/11 interface, for example, useful service statistics which may be derived include average throughput, radio and core network RTT (round trip time) delay, and total traffic, and relevant dimensions for these include application, BSID, IMSI, PDSN, website, date and time; useful individual user data which may be derived includes access time, average throughput, total traffic, delay, and set up time; and useful per session information which may be derived includes access time, average throughput, total traffic, set up time, average PPP throughput (uplink and downlink), average TCP throughput (uplink and downlink), and IMSI (relevant dimensions for these include session, IMSI, date and time, and source address). At a higher level queries may be defined, for example, to provide information on A10 peak throughput, A11 registration reply and update messages, abnormal mobile registrations, abnormal TTP events, and A10 LCP/IPCP (link control protocol/IP control protocol) configure code rejects; relevant dimensions for these include BSID, IMSI, time/date, and session. It will be appreciated that in general Event listeners based upon state models provide tools for generating a range of useful diagnostic information.

Figure 6:
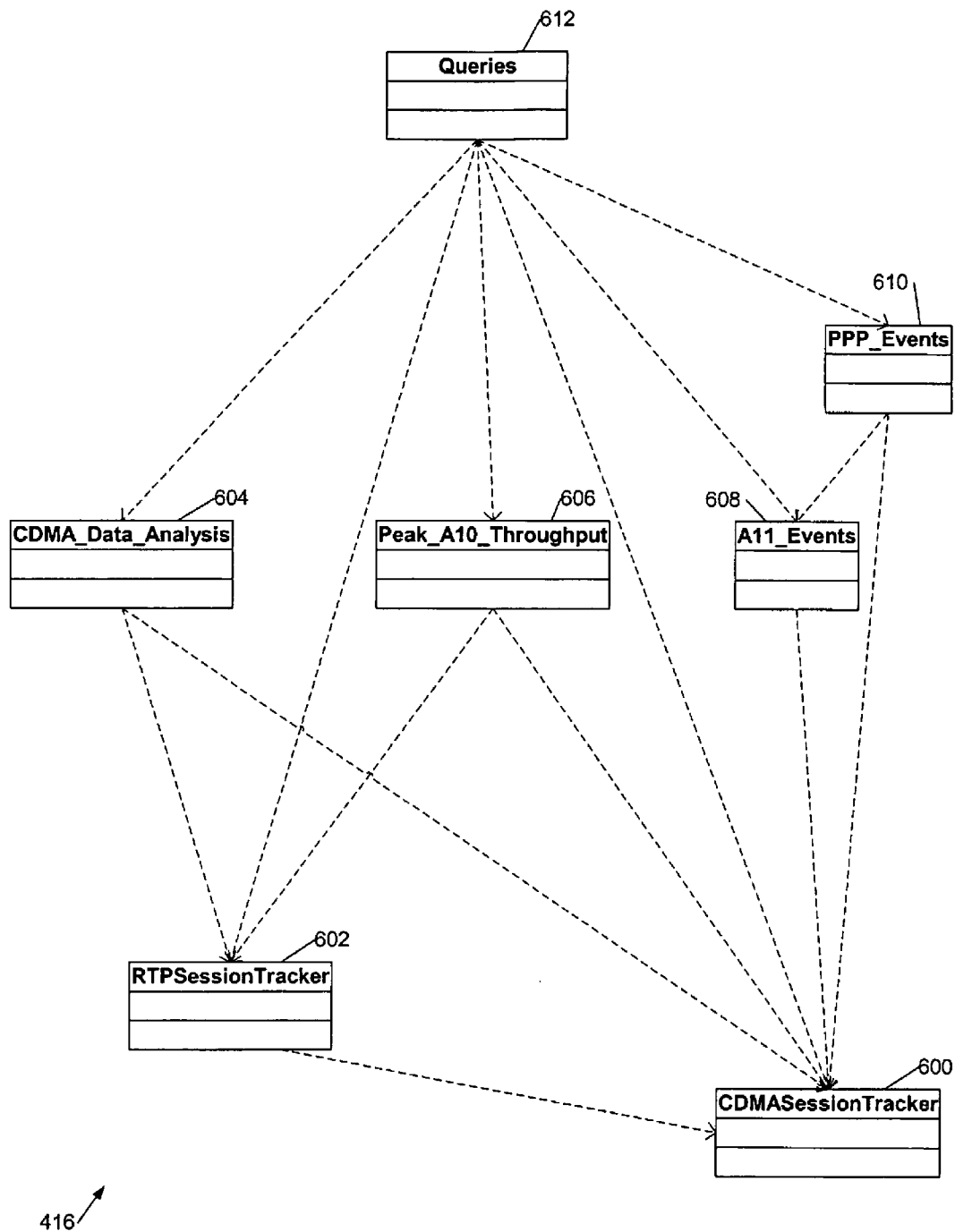
FIG. 6 shows a schematic diagram of a listener tree illustrating dependencies amongst listeners.

FIG. 6 shows an example of a listener tree 416, illustrating some of the dependencies which can arise. Thus at the lowest level of the tree, that is closest to the start of data pipe 414 of FIG. 4a, are two session trackers, an RTP session tracker 602 and a CDMA session tracker 600. Both of these require a minimum time in order to guarantee a valid output, 1000 milliseconds for the CDMA session tracker and 2000 milliseconds for the RTP session tracker. It will also be noted that the RTP session tracker 602 requires a valid output from the CDMA session tracker 600 and in embodiments of the invention these minimum time requirements and dependencies define segments of data pipe 414 of FIG. 4a and, more particularly, brakes in between separate segments of the data pipe as described further below. Thus a first segment of the data pipe is arranged to guarantee a minimum time of one second for the CDMA session tracker listener 600, which is preferably attached at the start of this segment, and a subsequent segment is arranged to provide a minimum time of two seconds before messages exit from this segment of the data pipe, for RTP session tracker 602. Higher levels of the listener tree employ a dataTesting_analysis listener 604, a peak_A10_throughput listener 606, an A11_events listener 608 (as previously described with reference to FIG. 5a) and a PPP_events listener 610, and above these are a set of query listeners 612, all with dependencies as illustrated by dashed lines in FIG. 6. However in this example none of listeners 604-612 have a minimum time requirement and all these may therefore be attached at the start of a third segment (which need only have a length of one message). Since listeners are preferably attached at the start of a segment, and to the first slot (herein after also called an attribute storage block, ASB) in order for the correct dependencies between listeners 604-612 to be maintained these listeners are given a priority. Thus all of listeners 604-612 are attached at the first slot of a third segment of the data pipe but listeners 604, 606 and 608 are given a priority of 2 (higher than 1), listener 610 is given a priority of 1, and query listeners 612 are given a priority of 0 so that listeners 604, 606, 608 fire first, listener 610 fires second, and listener (s) 612 fires third. It can therefore be seen how the listeners tree and the minimum time requirements and dependencies between the listeners defined in the tree can be employed to define a structure for the data pipe 414 of FIG. 4a, as will be described in more detail below with reference to FIG. 7.

Figure 7A:
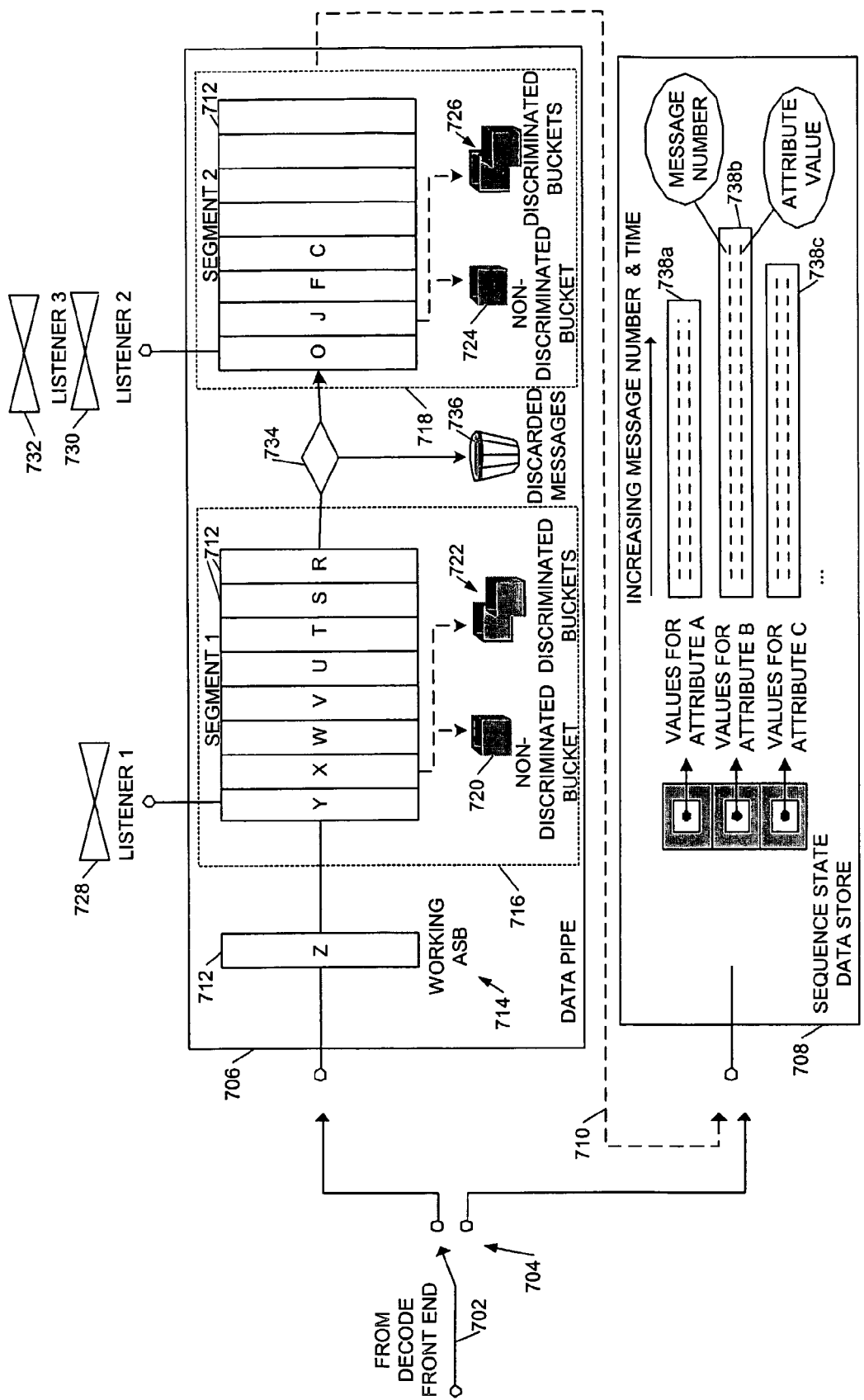

Referring now to FIG. 7a, this shows a data storage and processing system 700 embodying aspects of the present invention. Data from a front end protocol stack decoding system (such as steps S400, S401 of FIG. 4a) enters the system at input 702 and is directable by means of a switch 704 either to a data pipe 706 or to a sequence state data store 708. As illustrated by dashed line 710 and output of data pipe 706 may also provide input data to sequence state data store 708. The data pipe 706 comprises a plurality of ASBs (attribute storage blocks) 712 for storing attributes such as scalars, fixed arrays, pointers to sparse arrays and strings for holding values of parameters read from decoded messages and for holding values of parameters output by listeners attached to the data pipe. Preferably each of the ASBs is configured to be able to store all of the message parameters it is desired to process and output data from all the listeners attached to the data pipe although for most messages this capacity will not be needed. However this sparse array structure, although memory inefficient, facilitates rapid access.

Following an initial working ASB 714 the ASBs in the data pipe are divided into segments, in the illustrated example two segments 716, 718. A segment is a data structure comprising a variable number of ASBs which guarantees a minimum time interval between a message (or more particularly message parameter data) entering at one end or the segment and exiting at an output of the segment. When a new message is input to the segment the segment checks whether it is newer than the pre-determined time length of the segment (time is an ASB parameter) and if not the segment length grows by one message; if the new message is more than the pre-determined interval, say one second, later than the oldest message then the oldest message is output from the segment. Thus the data structure grows into place and at intervals housekeeping may be performed to free up any unused memory so that, logically, the structure may also shrink.

As previously mentioned adopting a segmented structure for the data pipe provides a mechanism for implementing a listener tree where some listeners require a minimum time interval to provide their output data. Segmenting the data pipe also facilitates a clear definition of a current and (most recent) previous or "last" value of a parameter. In FIG. 7a segment 718 contains earlier or older message data than segment 716 but some listeners, such an events listener implementing a state machine, need a reliable definition of current and last parameter values. By segmenting the data pipe the operation of a listener may effectively be restricted to a segment so that after that segment a stable set of parameter values is available to the next segment. It will be appreciated, for example, that the state of a call defined by messages in, say, segment 718 may not be the same as the state of the call defined by the later messages held in segment 716. For example a listener attached to segment 716 may need a minimum time, say three seconds, to determine whether or not a call has been dropped and therefore by defining segment 716 to have a length of say three seconds and unambiguous identification of a dropped call state may be provided to a listener in the following segment. In a 3G phone network there may be many hundreds of messages per second and a segment may therefore be relatively large. Where the dependencies between listeners allow two or more listeners both with minimum time (or number of message) constraints to be attached to the same segment they are both attached at the same ASB (also here termed a "slot") and the segment length is then chosen to be the greatest of the two (or more) minimum times. Preferably the data pipe is divided into a minimum total number of segments required to implement a listener tree, for simplicity and economy. The top level of a listener tree generally comprises one or more query listeners to determine session-related statistics and these do not normally have a minimum time or number of messages requirement and thus the last "segment" of the data pipe may therefore comprise just a single ASB. In other embodiments the final "segment" of a data pipe may have a length of 0 since no buffer at this stage is generally required.

The data structure implementing the ASBs for a segment preferably also implements one or more "buckets" to hold parameter data and a bucket may be thought of as an ASB attached to the side of the FIFO (first-in first-out) ASBs through which the messages propagate (although in practice a circular buffer is used). Thus in FIG. 7a segment 716 includes a non discriminated bucket 720 and a plurality of discriminated buckets 722, and likewise segment 718 includes a non discriminated bucket 724 and a plurality of discriminated buckets 726. These buckets hold the previous values of parameters, more specifically the most recent previous or "last" values of parameters, last being defined with reference to a current set of parameter values or a (generally incomplete) set of parameters in the first slot of the segment. Listeners are always attached at the first slot of a segment so that they see the same current state or step of parameters. The capacity of a data bucket is preferably defined by the superset of all the requirements of all the listeners attached to the data pipe, but not every segment may be provided with buckets (for example the first segment may lack discriminated buckets as described further below). When a new message enters a segment the current message parameters become the "last" parameters either for the captured message stream as a whole (for a non discriminated bucket) and/or for just the particular communications session to which the message belongs (in the case of a discriminated bucket); the new message defines the next "current" parameters. Although some listeners write their results back into the data pipe at the slot to which they are attached other listeners will not output their data in time for this and may therefore write information into an earlier slot (that is, to the right in FIG. 7). When this happens the segment data structure recognises that data is being written into the structure and updates the appropriate bucket or buckets (non discriminated and/or discriminated, for the message) accordingly.

In FIG. 7a three listeners are attached to data pipe 706, a first listener 728 at the first slot of segment 716, and second and third listeners 730, 732 at the first slot of segment 718. Where discriminated buckets are implemented the first listener 728 will generally be a session tracking listener which writes into the slot for each message a communications session identifier for identifying the communications session to which the message belongs (at least where the message belongs to such a session and the session can be identified). In a simple network a session tracking listener may write a session identifier back into the first slot of the data pipe in which case it is straightforward to implement discriminated buckets in a first segment of the pipe or in a non-segmented pipe (as in this case segmentation may not be required). However in a network with more complicated signalling for setting up and/or handing over a communications session a session tracking listener will generally need a segment to itself in which case discriminated buckets may not be implemented on the first segment, but only on one or more subsequent segments, once valid session identification information is available for indexing a discriminated bucket.

The use of data buckets, in particular discriminated buckets, facilitates the use of event listeners implementing a state model or machine without the need for unduly large memory storage requirements. As previously described, a current and (most recent) previous value of a parameter or set of parameters may be used to determine a state of a communications session or network entity and the use of a set of discriminated buckets enables a plurality of communications sessions and/or network entities to be modelled in parallel. Although, as mentioned above, a data bucket preferably comprises storage for a complete set of parameters used by the listeners attached to the data pipe a bucket does not in general provide sparse data storage as it gradually fills up with "last" parameter values, so that in general different parameters stored in the bucket have last values set at different times. However in preferred embodiments there is only a single "current" set of parameters, namely the set of parameters defined by the slot at the start of a segment, and since each slot holds parameters from a single message a "current" set of parameters effectively defines a single current communications session. Hence a single event listener for a selected communications session/entity is active at any one time (within a particular segment—different segments have different notions of "current message") although a plurality of sessions/entities is being modelled. Broadly speaking, in operation a listener reads a communications session identifier and a set of current parameters from the slot to which it is attached and then uses the session identifier to index a discriminated bucket from which to read the last value or values of a set of parameters.

It will be appreciated that the systems needs only as many discriminated buckets as there are sessions/entities whose state it is desired to track. However because multiple discriminators (orthogonal or not) such as session/call/TCP identity may be employed in general a single message may have more than one discriminated bucket with which it is associated and hence also multiple state models/event listeners. Preferably the minimum number of necessary buckets is employed but for some overall statistics it can sometimes also be useful to implement a non-discriminated bucket which simply stores the last value of a parameter regardless of communications session identity. Furthermore since the number of discriminated buckets can potentially increase indefinitely these buckets are preferably purged at intervals. The skilled person will appreciate that a segmented data pipe is not essential to implementing either discriminated or non-discriminated buckets although the combination of segmentation and data buckets helps to reduce overall memory storage requirements and to increase operational robustness.

As has previously been mentioned, the structure and length of the data segments are effectively defined by the listener tree attached to the data pipe and more particularly the listeners and their interdependencies as shown, for example, in FIG. 6. To illustrate this further an extract from the definition of a listener tree is shown below, in which it can be seen that the first segment (segment 0) has single listener, a CDMA session tracker, with a number of child listeners including an A11_events (state model) listener and three query listeners for providing session statistics. As the CDMA session tracker listener has a minimum time requirement of 1000 milliseconds the segment is configured to guarantee that this minimum time is available to the listener to write its output parameters into the data pipe. A selection of the parameters or attributes available to this listener ("AttrGot") for example from captured messages, are listed together with an example an output parameter or attribute set by the listener ("AttrSet", a CDMA packet session identifier). The next segment (segment 1) has a minimum time requirement of 2000 milliseconds arising from the TCP session throughput listener. Three listeners are attached in this segment and these fire in order of priority, priority 2 first. Again a selection of attributes available to and set by the listener is included for the purposes of illustration. The third segment (segment 2) has a minimum time requirement of 5000 milliseconds, dictated by the requirements of the data testing listener in this segment (which are greater than the requirements of the IP throughput listener. Furthermore it can be seen that the data testing listener requires output data from both the TCP session throughput listener (in segment 1) and the TCP/UDP session tracker (also in segment 1), which in turn rely upon the CDMA session tracker listener in segment 0. It can be seen how the minimum time requirements and dependencies amongst the listeners dictate a segment structure, uniquely if as many listeners as possible are placed on a segment and as few segments as possible are employed. Finally for the purposes of illustration some listeners attached to a fourth and final segment (segment 3) are listed, including an A11 event tracking listener, which has the highest priority (fires first) within this segment since other listeners, in particular query listeners providing statistical output data, depend upon attributes set by the A11 event listener. This final listener has a minimum time requirement of 0 and thus providing some provision is made for the intermediate storage of attributes set by the A11 event listener this segment may have a length of 0 and effectively be dispensed with. The A11 event listener also illustrates the use of a bucket indexed by a CDMA packet session identifier discriminator and storing a range of parameters such as those indicated. The query listeners also provide results which are broken by CDMA packets session identifier but in their case no data bucket is needed as these listeners are not "stateful", that is they do not need knowledge a current and previous set of parameter values.

Segment 0 Minimum Time 1000
Listener: CDMASessionTracker, Priority 0
   Child Query Session Statistics (by Date)
   Child Query Session Statistics (by Session)
   Child Event A11_Events
   Child Query IMSI Statistics (by IMSI) . . .
Requirements:
   Minimum Time 1000
   AttrGot A11_BSID
   AttrGot A11_IMSI . . .
   AttrSet CDMA_Packet_Session_Id . . .

Segment 1 Minimum Time 2000
Listener: RTPSessionTracker, Priority 2
   Parent CDMASessionTracker
   Child TCPUDPSessionTracker . . .
Requirements:
   Minimum Time 0
   AttrGot A11_Message_Type
   AttrGot RTP_Timestamp
   AttrGot IP_SourceAddress
   AttrGot IP_DestinationAddress . . .
   AttrSet RTP_SessionId . . .
Listener TCPUDPSessionTracker, Priority 1
   Parent CDMASessionTracker
   Parent RTPSessionTracker
   Child Query Session Statistics (by Date)
   Child Query Session Statistics (by Session)
   Child Query IMSI Statistics (by IMSI) . . .
Requirements
   Minimum Time 0
   AttrGot CDMA_Packet_Session_Id
   AttrGot IP_SourceAddress
   AttrGot IP_DestinationAddress
   AttrGot TCP_SourcePort
   AttrGot TCP_DestinationPort
   AttrGot TCP_SequenceNumber . . .
   AttrSet UDP_SessionId . . .
Listener Throughput_TCPSession Priority 0
   Parent TCPUDPSessionTracker . . .
Requirements
   Minimum Time 2000
   AttrGot IP_Dir
   AttrGot TCP_SessionId
   AttrSet TCP_Session_ThroughputDL
   AttrSet TCP_Session_ThroughputUL . . .

Segment 2 Minimum Time 5000
Listener Throughput_IP Priority 0
   Parent: TCPUDPSessionTracker . . .
Requirements
   Minimum Time 2000
Listener DataTesting Priority 0
   Parent Throughput_TCPSession
   Parent TCPUDPSessionTracker . . .
Requirements
   Minimum Time 5000
   AttrGot IP_SessionId
   AttrGot TCP_Session_ThroughputDL
   AttrGot TCP_Session_ThroughputUL
   AttrSet Application_Throughput_DL
   AttrSet Application_Throughput_UL
Listener Throughput_TCP Priority 0 . . .
   Parent TCPUDPSessionTracker
Requirements
   AttrSet TCP_ThroughputUL
   AttrSet TCP_ThroughputDL Segment 3 Minimum Time 0
Listener Event A11_Events Priority 2
   Parent CDMASessionTracker
   Child Query Session Statistics (by Date)
   Child Query Session Statistics (by Session)
   Child Query IMSI Statistics (by IMSI)
   Child Event PPP_Events
Discriminator: CDMA_Packet_Session_Id
Bucket:
   PCF_Transfer_State
   A11_Airlink_RecordType
   Time
   A11State_Internal
   Session_Termination_Start . . .
Requirements
   Minimum Time 0
   AttrGot CDMA_Packet_Session_Id
   AttrGot PCF_Transfer_State
   AttrGot A11_Airlink_RecordType . . .
   AttrGot IP_Protocol
   AttrGot PPP_Protocol
   AttrGot Time . . .
   AttrSet A11State
   AttrSet Packet_Data_CallSetupTime . . .
Listener Event PPP_Events Priority 1
   Parent Event A11_Events
   Parent CDMASessionTracker
   Child Query Session Statistics (by Date)
   Child Query Session Statistics (by Session)
   Child Query IMSI Statistics (by IMSI) . . .
   AttrGot . . .
Listener Query Session Statistics (by Date) Priority 0
   Parent Event A11_Events
   Parent CDMASessionTracker
   Parent Event PPP_Events
   Parent TCPUDPSessionTracker Discriminator CDMA_Packet_Session_Id
AttrGot CDMA_Packet_Session_Id . . .
(No Bucket, No Children)
Listener Query Session Statistics (by Session) Priority 0
Parent Event A11_Events . . .
Parent Event PPP_Events
Parent TCPUDPSessionTracker
Discriminator CDMA_Packet_Session_Id
(No Bucket, No Children)
Listener Query IMSI Statistics (by IMSI) Priority 0 . . .

The structure of a listener tree is effectively defined by defining the top level of the tree, that is a desired set of output parameters of queries (a "project") to implement. Once this has been done based upon data of the type shown above, in particular for each listener of a set of available listeners parent/child relationships, requirements (time and parameters) and discriminator and bucket data; this may be conveniently published in a listener requirements data file and updated as necessary when listeners are added/removed/changed.

Figure 7B:
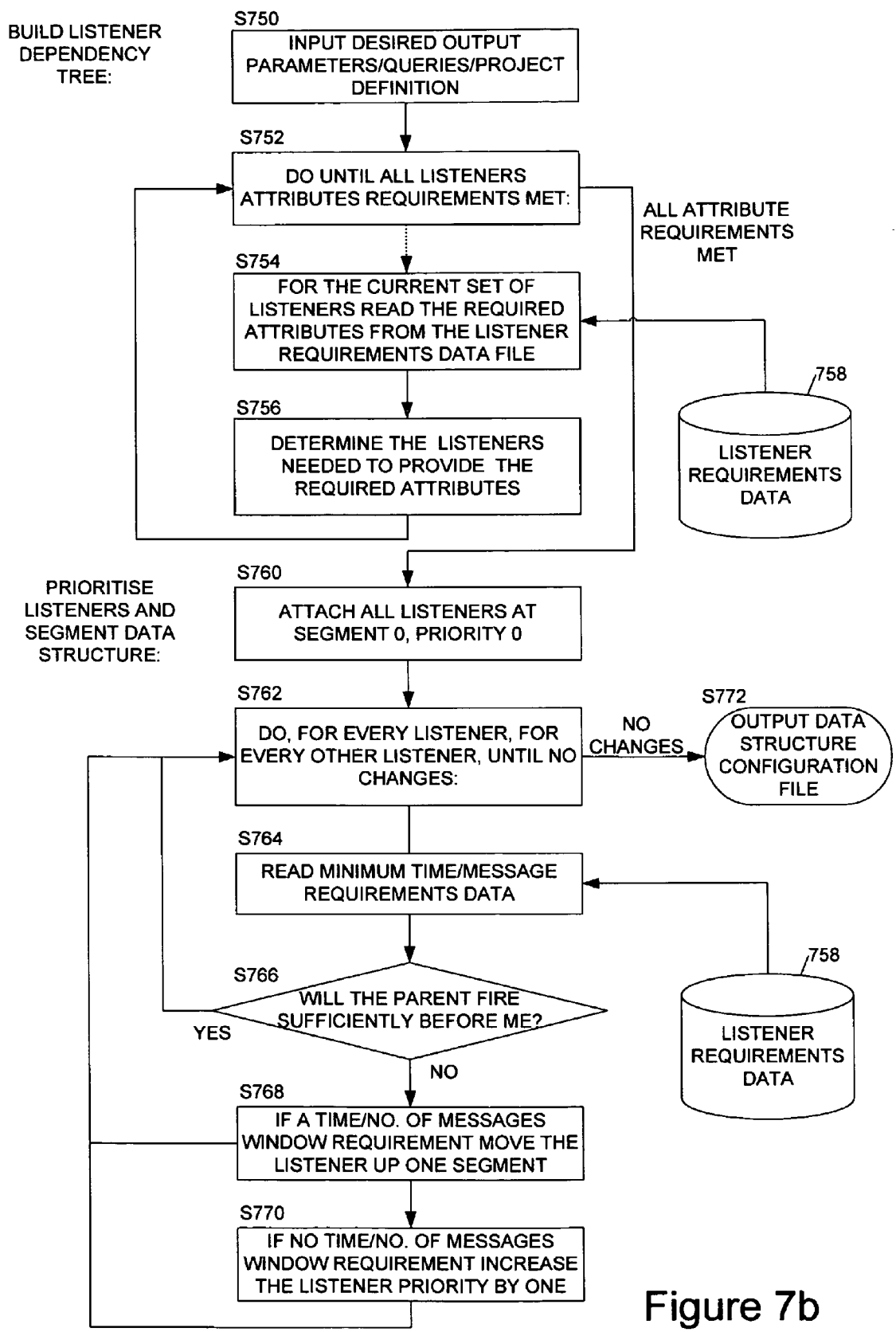

A procedure for automatically determining where listeners are to be attached to a data pipe, and also a segmentation of the pipe, is shown in FIG. 7*b*. Referring to FIG. 7*b*, at step S . . . such a procedure may be implemented in two stages, first building a listener dependency tree and then prioritising the listeners and segmenting the data pipe. Thus step S750 data is input to the procedure defining a desired set of output parameters/queries or, equivalently, a project definition as referred to earlier. Then, at steps S752, S754 and S756 the procedure effectively walks back down the dependency tree, for each listener determining what other listeners are required in order to provide the input parameters it needs, looping until all the requirements of all the listeners are met. The number of times the procedure loops is equal to the length of the longest dependency chain, typically less than 10. Listener requirements data, that is at least a list of attributes a parameter gets and a list of attributes the parameter sets together with any requirements for a minimum number of messages/minimum time for the listener's output to be valid, is read from a listener requirements data file 758 (shown twice in FIG. 7*b* for ease of representation). Following this a second iterative procedure prioritises the listeners and determines where segment brakes in the data pipe are to occur. Thus at step S760 the listeners are all initially attached at priority 0 to segment 0 and then another do loop (S762) is implemented, for every listener, for every other listener reading the listener requirements (S764) and determining whether, if the listener has a parent, the parent will be executed sufficiently before the listener (S766). If the condition is met the procedure keeps checking through the tree, going back to the do loop S762, otherwise if the listener has a window requirement, that is a minimum number of messages/time requirement for a valid output then the listener is bumped up one segment (S768) otherwise the listener's priority is increased by one (S770), in both cases the procedure then looping back to the do loop (S762). Eventually a point is reached when there are no further changes in the listener's positions/priorities and the procedure then outputs a data structure configuration file along the lines of the example given above, defining a set of segments for the data pipe, the listeners to be attached at each segment, and their relative priority. It can be seen that the procedure operates a little like a bubble sought algorithm in which listeners keep getting moved up in priority and/or segment until they are all far enough away from one another to implement the desired listener tree, typically the initial communications session tracking listener getting pushed up until it ends up at the "top" of the structure, that is in the first segment (closest to the decoded parameter data input).

Referring back again now to FIG. 7*a* it can be seen that between first segment 716 and second segment 718 there is preferably located a decision module 734 for selectively culling messages moving from one segment to the next. As indicated in FIG. 7*a* cold messages are notionally discarded 736 although in practice decision module 734 may simply selectively forward to segment 718 a message exiting segment 716. The culling procedure may simply comprise discarding certain messages or it may comprise a more complex combining or binning of messages. The culling process is illustrated schematically in FIG. 7*a* by the sequence of letters in the attribute storage blocks, which are consecutive in the first segment but which have gaps in the second segment. In preferred embodiments the culling procedure in implemented by a listener such as first listener 728 attached to a segment before the culling decision module, this culling listener being configured to identify a particular type of message or class of messages and to label or flag the messages (that is their parameters) so that when the messages exit the segment the decision module merely needs to check whether or not the flag is set in order to determine whether or not discard a message.

In 3G networks it is common for mobile devices such as cones, scanners and the like to produce large numbers of measurement-related messages such as "Searcher and Finger Information" messages from Qualcomm cdma1X devices, and Rake Finger messages and Pilot Channel messages in other networks/from other handsets. Often there can be from 10 to 100 of this type of message per second and in one handset measured almost 80% of the messages were of this general type. It can therefore be appreciated that significant memory and processing games can be achieved by removing messages of this type, at least following the first segment, either by discarding the messages completely or by combining and or sampling the messages. As there can be situations in which the messages are useful the culling may be user controllable, for example at a user selectable time resolution appropriate to, say, geographical information on a map on which collected data is being plotted. A sophisticated culling listener may even be adaptive, responsive to the data content of the stream, for example culling many messages under normal circumstances and then refraining from culling messages around a significant message. An example of this is in UMTS where a phone reports many pilot and rake receiver measurements (50 millisecond intervals or a Qualcomm chip set) but does not communicate with the network at all (because it has good signal strength)—in this case many of the messages may be culled as the situation is of little interest but at a later point the phone may begin communicating its measurements with the network and at that point the listener may start to allow all the measurements to proceed for analysis.

Finally, referring again to FIG. 7*a*, a sequence state data store 708 may also be included in the system as a more memory efficient arrangement for retaining captured data after processing in data pipe 706 for future reference and/or drill-down and the like. Thus captured (and filtered) message parameter data from data pipe 706 may be provided to the sequence state data store 708 or this may be derived directly from the decode front end, for example with an option to bypass the data pipe if desired. A preferred embodiment of a sequence state data store is illustrated in FIG. 7*a* in which an expanding data structure 738*a, b, c* is provided for values for each attribute to be stored. Each expanding data store stores pairs of values comprising an attribute value and an associated message number, in FIG. 7*a* the length of each bar effectively corresponding to the number of times a value of a particular attribute has been included in any of the messages captured. It can be seen that this provides more efficient data storage but as attribute values are not discriminated by communications session analysing data stored in this way is considerably slower.

Figure 8:
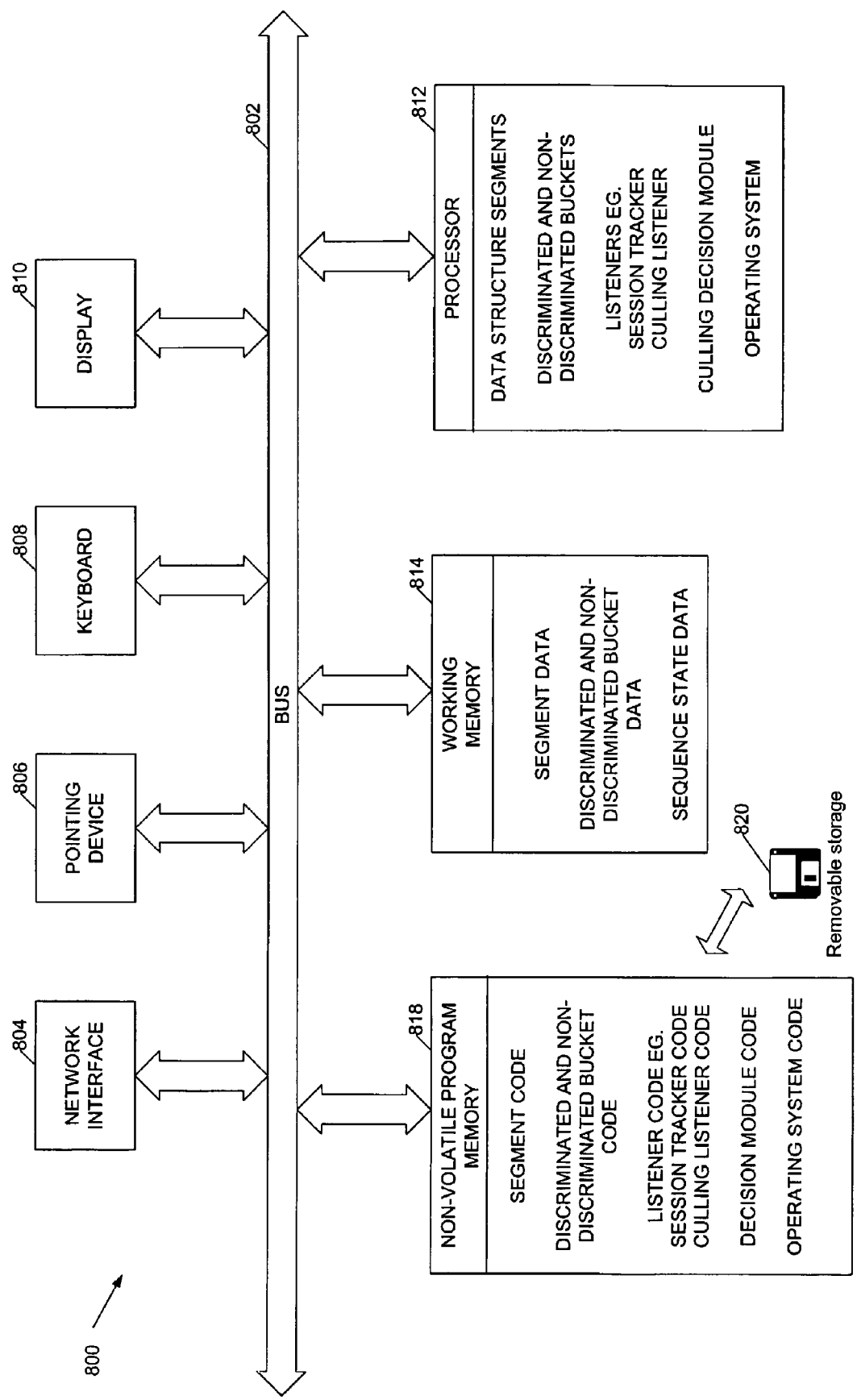

FIG. 8 shows a block diagram of general purpose computer system which may be employed to implement the data storage and processing system of FIG. 7a. Code to implement the system may be written in any conventional programming language, for example Visual C++. The computer comprises a data and address bus 802 to which are connected a network interface 804, and optionally a pointing device 806, a keyboard 808, and a display 810. Non volatile programming memory 818 stores segment code, discriminated and non-discriminated bucket code, listener code e.g. session tracker code and culling listener code, decision module code, and operating system code, as described above, and a processor 812 loads and implements this code to provide corresponding functions. Working memory 814 here stores segment data, discriminated and non-discriminated bucket data, and sequence state data. Some or all of the code in programme memory 818 may be provided on a removable storage medium 820 illustratively shown by a floppy disk. A similar computer system may be used to run code to automatically define segments of a data structure.

Applications of embodiments of the above described system are not limited to any particular type of network although embodiments of the systems are particularly advantageous for storing and/or processing data captured from digital mobile phone networks. Thus systems similar to that described above may be employed in connection with other mobile communications networks, including networks more frequently thought of as computer data networks, where these have communications sessions or calls which can be investigated by intercepting packets at an interface (internal or external) of the network. This might include, for example, VoIP (Voice over Internet Protocol) calls within a computer data network.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of storing data in a memory, the data being captured from a digital communications network, for processing by a processing unit that accesses the memory and executes computer executable instructions, said captured data comprising a stream of messages having message parameters, said stream of messages comprising messages of a plurality of communications sessions, the method comprising:
   inputting data from said stream of messages;
   writing, for sequential ones of said stream of messages, sequential sets of parameters into a first FIFO (first-in first out) data structure, at an entry point of said first FIFO data structure;
   reading said sequential sets of parameters from an exit point of said first FIFO data structure; and
   writing said sequential sets of parameters read from said first FIFO data structure into a second data structure; and
   wherein said entry point and said exit point are separated by a first data structure length; and wherein said first data structure length has a predetermined minimum value when a set of parameters of said sequential sets of parameters is read from said exit point, wherein said predetermined minimum value is defined in terms of a plural number of said sets of parameters and/or in terms of a time between writing of one of said sets of parameters into said first data structure at said entry point of said first FIFO data structure and reading of a set of parameters of said sequential sets of parameters from said exit point of said first data structure, said time sufficient to write sets of parameters successively into said first FIFO data structure.

2. The method as claimed in claim 1 wherein said second data structure comprises a FIFO data structure.

3. The method as claimed in claim 1 wherein said length defines a predetermined minimum time between one of said sets of parameters being written into and read from said first FIFO data structure.

4. The method as claimed in claim 3 wherein a message rate of said stream of messages varies, and wherein said first FIFO data structure stores a variable number of said sets of parameters.

5. The method as claimed in claim 1 comprising effectively moving said captured data through a plurality of chained FIFO data structures at least some of which have a respective predetermined minimum length.

6. The method as claimed in claim 1 wherein at least one of said first and second data structures includes a last value data store to store a previous value of one or more of said sets of parameters, the method further including updating said last value data store when one or more said sets of parameters is written into said first FIFO data structure.

7. The method as claimed in claim 6 wherein at least one of said first and second data structures includes a plurality of said last value data stores to store a plurality of most recent previous values of one or more of said sets of parameters for a corresponding plurality of said communications sessions, the method further comprising:
   identifying a communications session to which a set of parameters of the one or more sets of parameters belongs; and
   updating a last value data store for said communications session when one or more said sets of parameters is written into said first FIFO data structure.

8. The method as claimed in claim 7 wherein said identifying comprises reading parameter data from said first data structure and writing session identification data into said first data structure, wherein said second data structure includes said plurality of least value data stores, and wherein said updating a last value data store for said communications session includes reading said session identification data to identify a last value data store to update.

9. The method as claimed in claim 8 wherein said first and second data structures each comprise a sequential plurality of storage blocks, each storage block having a plurality of storage elements, one for each of a superset of said sets of parameters comprising a set of all parameters selected for storage.

10. A system for processing data captured from a digital communications network to provide output data, the system comprising:
   a data pipe configured to store said captured data as a time-ordered sequence, said data pipe having at least a first region and a second region, said second region corresponding to earlier times than said first region;
   at least one first listener attached to said first region of said data pipe;
   at least one second listener attached to said second region of said data pipe; and
   wherein said at least one first listener is configured to read input data from said data pipe and to write first listener output data determined from said input data back to said data pipe, wherein at least some of said first listener output data is not valid until after a delay greater than a time sufficient to write data successively into said data pipe;

wherein said at least one second listener is configured to read second listener input data including said first listener output data from said data pipe, and to provide output data determined from said read second listener input data; and wherein a start of said second region of said data pipe is earlier than a start of said first region of said data pipe by at least said delay.

11. The system as claimed in claim 10,
wherein said delay corresponds to a time interval;
wherein a rate of captured data storage into said data pipe is variable; and
wherein a length of said first region is variable.

12. The system as claimed in claim 10 comprising a plurality of said first listeners.

13. The system as claimed in claim 12,
wherein said first listener output data from one or more of said first listeners is dependent upon first listener output data from one or more others of said first listeners thereby defining a first listener dependency; and
wherein said first listeners are configured to operate in accordance with said first listener dependency.

14. The system as claimed in claim 10 wherein said captured data comprises a stream of messages having message parameters and including messages of a plurality of communications sessions, at least some of said messages including session-identifying parameters.

15. The system as claimed in claim 14 wherein said at least one first listener includes a listener to identify a session of the plurality of communications sessions and to write session identity data to said data pipe.

16. The system as claimed in claim 14 further comprising a plurality data buckets associated with at least one of said first and second data pipe regions, each bucket corresponding to a communications session of the plurality of communications sessions and being configured to store one or more previous values of said message parameters for said session.

17. A non-transitory computer readable medium storing computer program code for processing data captured from a digital communications network, said captured data comprising a stream of messages, one of said messages including message parameters, said stream of messages comprising messages of a plurality of communications sessions, the code comprising:

receiving message parameter data at an input of a first FIFO module from said stream of messages and said first FIFO module having an output;

coupling an input of a second FIFO module to said output of said first FIFO module; and wherein said message stream has a variable rate and wherein said first FIFO module is configured to guarantee a time delay between said first FIFO input and said first FIFO output of at least a minimum value greater than a time sufficient to write message parameter data successively into said first FIFO module.

18. The computer program code as claimed in claim 17 further comprising:

coupling a first data processing module to said first FIFO module;

reading data from said first FIFO module at said first data processing module; and writing processed data to said first FIFO module from said first data processing module, and a second data processing module coupled to said second FIFO module to read data from said second FIFO module, wherein said second data processing module is configured to read said processed data from said first data processing module, and wherein said processed data is only valid after at least said minimum time delay value.

19. The computer program code as claimed in claim 18 wherein said processed data includes session discrimination data.

20. The computer program code as claimed in claim 19 wherein said second FIFO module has a plurality of associated data storage modules corresponding to a plurality of discriminated sessions, and wherein said code is configured to store message parameter data in a selected said data storage module responsive to said session discrimination data.

21. A non-transitory computer readable medium storing computer program code, for processing data captured from a digital communications network, said captured data comprising a stream of messages having message parameters, said stream of messages comprising messages of a plurality of communications sessions, the code comprising:

receiving message parameter data at an input of a first FIFO module from said stream of messages and said first FIFO module having an output;

coupling an input of a second data processing module, in particular a FIFO module, to said first FIFO module output;

coupling a data culling module between said first FIFO output and said second data processing module input; and selectively culling data at said data culling module to reduce a rate of data processed by said second data processing module compared with said first FIFO module.

22. The computer program code as claimed in claim 21 further comprising labeling messages at a message labelling module coupled to said first FIFO module for culling by said data culling module.

23. The computer program code as claimed in claim 21 further comprising a session discrimination module, and a plurality of storage modules responsive to said discrimination module each to selectively store message parameters for a communications session of the plurality of communications sessions.

24. A method of defining a data storage structure stored in memory, the data storage structure comprising FIFO structures coupled in series, at least one said FIFO structures has a guaranteed minimum length, one or more data processing modules comprising computer executable instructions stored in the memory, the processing modules being executed by a processing unit that accesses the memory and executes computer executable instructions, wherein the one or more data processing modules are couplable to each of said FIFO structures to receive data from the structure, the method comprising:

inputting a required parameter set;

determining a set of data processing modules required to provide said required parameter set, one or more of said modules having a minimum required time for a valid output, others of said modules being dependent upon said valid output; and positioning said data processing modules on said data storage structure to define a structure in which said at least one FIFO of said FIFO structures with a guaranteed minimum length is defined by a module of said one or more data processing modules with a minimum output validation time, and a subsequent series coupled FIFO is defined by a module of said one or more data processing modules dependent upon said valid output,
wherein said at least one FIFO has said guaranteed minimum length when a parameter set is output from said at least one FIFO to said subsequent series coupled FIFO, said guaranteed minimum length being defined in terms of a plural number of said sets of parameters and/or in terms of a time sufficient to write sets of parameters successively into said at least one FIFO.

25. A non-transitory computer readable medium storing computer executable instructions, which when being executed by a processing unit, perform the method of claim 24.

26. A method of storing data in a memory captured from a digital communications network for processing by a processing unit that accesses the memory and executes computer executable instructions, said captured data comprising a stream of messages having message parameters, said stream of messages comprising messages of a plurality of communications sessions, the method comprising:
  inputting a current said message of said stream;
  discriminating between communications sessions to associate said current message with a communications session of the plurality of communications sessions to which the current message belongs;
  writing a set of parameters from the current message into a FIFO data structure identifying the communications session of the plurality of communications sessions to which the message belongs; and
  updating a last value data store associated with the communications session of the plurality of communications sessions with parameters of a previous message of the session in response to said associating said current message with the communications session of the plurality of communications sessions,
  wherein a communications session of the plurality of communications session is a thread of messages having at least one network entity in common and said discriminating is performed on the basis of information in said current message for linking the current message into said thread.

27. The method of processing data stored according to claim 26, the method comprising determining, for a communications session of the plurality of communications sessions communications sessions, a current value and a last value of one or more of said parameters, from a current message and said last value data store, and processing said current and last value to provide an output value.

28. The method of processing data as claimed in claim 26 wherein said communications session of the plurality of communications sessions involves an entity of said network, and wherein said output value comprises an estimated state of said entity.

29. A non-transitory computer readable medium storing computer executable instructions, which when being executed by a processing unit perform the method of claim 26.

30. A non-transitory computer readable medium storing computer program code for storing data captured from a digital communications network for processing, said captured data comprising a stream of messages having message parameters, said stream of messages comprising messages of a plurality of communications sessions, the code comprising:
  sequentially storing said messages in a buffer module;
  associating said message at a discriminator module with a communications session of said plurality of communications sessions; and
  storing, at a bucket module, a most recent previous value for one or more of said message parameters for each of a plurality of said communications sessions in response to said discriminator module,
  wherein said communications session of said plurality of communications sessions is a thread of messages having at least one network entity in common and said discriminating is performed on the basis of information in said message for linking the message into said thread.

31. A method of modeling a plurality of communications sessions or network entities substantially in parallel by a processing unit that accesses a memory and executes computer executable instructions, using data stored in the memory, the data being captured from a digital communications network, said captured data comprising a stream of messages having message parameters, said stream of messages comprising messages of a plurality of communications sessions, a communications session of the plurality of communications sessions comprising a thread of messages communicated by or to a network entity of the plurality of network entities common to said thread messages, the method comprising:
  storing, for each said session or entity, a most recent previous value for a parameter set comprising one or more of said parameters;
  determining, for a current message, a communications session or entity to which the message belongs, on the basis of information in said current message for linking the current message into said thread;
  determining one or more current parameter values from said current message;
  updating a state model for said communications session or entity to which the message belongs using said one or more current values and said most recent previous parameter set value for said communications session or entity;
  updating said most recent previous value parameter set using said one or more current parameter values; and
  repeating said determining and updating to model said plurality of communications sessions or network entities using a parallel bank of said state models, one for each said session or entity.

32. The method as claimed in claim 31 wherein said plurality of network entities comprise a plurality of instantiations of a single type of network entity.

33. A non-transitory computer readable medium storing computer executable instructions, which when executed by a processing unit, perform the method of claim 31.

* * * * *